(12) United States Patent
Stachowiak

(10) Patent No.: US 6,589,658 B1
(45) Date of Patent: Jul. 8, 2003

(54) COATED ARTICLE WITH ANTI-REFLECTIVE LAYER(S) SYSTEM

(75) Inventor: Grzegorz Stachowiak, Ann Arbor, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 0 days.

(21) Appl. No.: 09/995,800

(22) Filed: Nov. 29, 2001

(51) Int. Cl.$^7$ ............................................. B32B 17/06
(52) U.S. Cl. ...................... 428/432; 428/426; 428/446; 428/448; 428/457; 428/469; 428/472; 428/673; 428/688; 428/689; 428/697; 428/698; 428/699; 428/701; 428/702; 428/704
(58) Field of Search ................. 428/448, 472, 428/432, 673, 697, 698, 699, 701, 702, 426, 446, 457, 469, 688, 689, 704

(56) References Cited

U.S. PATENT DOCUMENTS

| | | |
|---|---|---|
| 4,716,086 A | 12/1987 | Gillery et al. |
| 4,965,121 A | 10/1990 | Young et al. |
| 5,229,194 A | 7/1993 | Lingle et al. |
| 5,338,422 A | 8/1994 | Belkind et al. |
| 5,342,675 A | 8/1994 | Kobayashi et al. |
| 5,344,718 A | 9/1994 | Hartig et al. |
| 5,376,455 A | 12/1994 | Hartig et al. |
| 5,377,045 A | 12/1994 | Wolfe et al. |
| 5,514,476 A | 5/1996 | Hartig et al. |
| 5,521,765 A | 5/1996 | Wolfe |
| 5,557,462 A | 9/1996 | Hartig et al. |
| 5,563,734 A | 10/1996 | Wolfe et al. |
| 5,688,585 A | 11/1997 | Lingle et al. |
| 5,770,321 A | 6/1998 | Hartig et al. |
| 5,800,933 A | 9/1998 | Hartig et al. |
| 5,948,131 A | 9/1999 | Neuman |
| 6,014,872 A | 1/2000 | Hartig et al. |
| 6,059,909 A | 5/2000 | Hartig et al. |
| 6,132,881 A | 10/2000 | Hartig et al. |
| 6,159,607 A | 12/2000 | Hartig et al. |
| 6,210,784 B1 * | 4/2001 | Rondeau et al. ............ 359/580 |
| 6,238,781 B1 | 5/2001 | Anderson et al. |
| 6,306,525 B1 | 10/2001 | Schicht et al. |
| 6,445,503 B1 | 9/2002 | Lingle |
| 6,475,626 B1 | 11/2002 | Stachowiak |
| 6,495,251 B1 | 12/2002 | Arbab et al. |
| 6,495,263 B2 | 12/2002 | Stachowiak |
| 2001/0041252 A1 | 11/2001 | Laird |
| 2002/0031674 A1 | 3/2002 | Laird |

OTHER PUBLICATIONS

"Optical Interference Coatings", Technical Digest, Jun. 1995, Wolfe et al., pp. 115–117.

U.S. Patent Application S.N. 09/997,245, filed Nov. 30, 2001 (copy attached hereto).

* cited by examiner

Primary Examiner—Deborah Jones
Assistant Examiner—Andrew T Piziali
(74) Attorney, Agent, or Firm—Nixon & Vanderhye P.C.

(57) ABSTRACT

Coated articles are provided with an anti-reflective (AR) layer(s) system which enables reduced reflection, increased visible transmission, and/or neutral color. In certain embodiments, the AR layer(s) system includes a titanium oxide layer, a silicon oxynitride layer, and/or a silicon oxide layer on the substrate over an infrared (IR) reflecting layer(s) such as silver. Silicon nitride layer(s) may optionally be provided below and/or over the IR reflecting layer in certain example embodiments.

55 Claims, 12 Drawing Sheets

400
COATED ARTICLE WITH ANTI-REFLECTIVE LAYER(S) SYSTEM

This application relates to a coated article including an anti-reflective layer(s) system. The anti-reflective layer(s) system may include one or more layers.

BACKGROUND AND SUMMARY OF THE INVENTION

Coated articles are known in the art. For example, U.S. Pat. No. 5,800,933 discloses a coated article with a solar controlling layer system. The '933 coated article includes: substrate/$TiO_2$/$Si_3N_4$/NiCr/Ag/NiCr/$Si_3N_4$. For example, see FIG. 1 of the instant application. In such coatings, the NiCr contact layers function to protect the Ag (silver) layer and also serve as adhesion and/or nucleation layers. The dielectric layers (i.e., $TiO_2$, $Si_3N_4$) serve protective functions and also perform anti-reflection functions (i.e., they reduce visible reflectance), and as a result serve to increase transmission of the overall coated article. Other prior art coatings are similar to that shown in FIG. 1, but omit the $TiO_2$ layer.

While coated articles such as that shown in FIG. 1 provide good ultraviolet (UV) and/or infrared (IR) reflection, they do face problems. Such problems often relate to meeting high visible transmission requirements imposed by industry standards and/or markets, while simultaneously satisfying UV and/or IR needs. The need for higher visible transmission often forces coating designers to minimize contact layer thicknesses and/or change contact layer materials to less absorbing and/or less durable options. The unfortunate consequence may be marginal durability of the coated article if high transmission requirements are to be met. In other words, it would be desirable if visible transmission of such articles could be increased and/or if visible reflection of such articles could be reduced while maintaining good durability.

Neutral color is also desirable for coated articles in many applications. Unfortunately, many conventional methods of making color of a coated article more neutral result in decreased visible transmission and/or increased reflection. Heretofore, it has been difficult to increase visible transmission and reduce reflection, while at the same time providing more neutral color and maintaining satisfactory solar control or thermal characteristics.

In view of the above, it is an object of certain embodiments of this invention to provide a solar controlling coated article (i.e., an article including at least one layer for reflecting IR and/or UV) having increased visible transmission and/or reduced visible reflectance. In certain embodiments of this invention, it is an object to combine such high visible transmission and/or reduced reflectance with neutral color of the coated article. One or more of these objects is/are achieved by providing such coated articles with improved anti-reflection layer(s) system(s). Alternatively, the use of such improved anti-reflection layer(s) system(s) may enable coatings to have or utilize more robust contact layer(s) (e.g., thicker for better durability) and/or thicker silver (Ag) layer(s) (i.e., improved thermal performance) while maintaining similar transmission characteristics if increased transmission is not a most desired feature.

Another object of this invention is to fulfill one or more of the above-listed objects and/or needs.

In certain example non-limiting embodiments of this invention, one or more of the above-listed objects and/or needs is/are satisfied by providing a coated article including a coating supported by a glass substrate, the coating comprising: a metallic infrared (IR) reflecting layer sandwiched between first and second contact layers; a first dielectric layer having an index of refraction n<=2.7 (note: all indices of refraction "n" herein are at 550 nm) provided between the IR reflecting layer and the glass substrate; a second dielectric layer comprising titanium oxide provided over the IR reflecting layer; a third dielectric layer comprising silicon oxynitride provided over the IR reflecting layer; a fourth dielectric layer comprising silicon oxide provided over the IR reflecting layer; and wherein the third dielectric layer comprising silicon oxynitride is provided between the second and fourth dielectric layers.

In other example non-limiting embodiments of this invention, one or more of the above-listed objects and/or needs is/are satisfied by providing a coated article including a coating supported by a glass substrate, the coating comprising: a metallic infrared (IR) reflecting layer comprising silver sandwiched between first and second contact layers each of which contacts the IR reflecting layer; a first dielectric layer having an index of refraction n<=3.0 provided between the IR reflecting layer and the glass substrate; a second dielectric layer comprising silicon oxynitride provided over the IR reflecting layer; a third dielectric layer comprising silicon oxide provided over the IR reflecting layer; and wherein the second dielectric layer comprising silicon oxynitride is provided between the IR reflecting layer and the third dielectric layer comprising silicon oxide. Optionally, another dielectric layer comprising silicon nitride may be provided between the IR reflecting layer and the silicon oxynitride layer.

Certain other example non-limiting embodiments of this invention fulfill one or more of the above-listed objects and/or needs by providing a coated article including a coating supported by a glass substrate, the coating comprising: a metallic infrared (IR) reflecting layer sandwiched between first and second contact layers which contact the IR reflecting layer; a first dielectric layer having an index of refraction n<=3.0 provided between the IR reflecting layer and the glass substrate; a second dielectric layer comprising titanium oxide provided over the IR reflecting layer; a third dielectric layer comprising silicon oxide provided over the IR reflecting layer; and wherein the second dielectric layer comprising titanium oxide is provided between the IR reflecting layer and the third dielectric layer comprising silicon oxide.

In certain example non-limiting embodiments of this invention, silicon oxynitride layer(s) may be graded (oxidation graded and/or nitrogen graded) so as to vary their respective indices of refraction n throughout their thickness (es) in a desired manner. Moreover, titanium oxide layer(s) herein may be index graded (to change the index of refraction) by changing the microstructure of the layer throughout its thickness. For example, the index of refraction n of titanium oxide can vary as a function of crystalline structure and/or packing density in the layer; and such microstructure changes can be caused by pressure adjustments, substrate temperatures, post-treatment (e.g., heat treatment), deposition rate, angle of incidence, and/or substrate surface conditions.

Certain other example non-limiting embodiments of this invention fulfill one or more of the above-listed objects and/or needs by providing a coated article including a coating supported by a substrate, the coating comprising: a layer comprising Ag located between first and second contact layers which contact the layer comprising Ag; a first dielectric layer having an index of refraction n<=3.0 provided between the substrate and the layer comprising Ag; a second dielectric layer having an index of refraction n=2.1–2.7 provided over the layer comprising Ag; a third dielectric layer having an index of refraction n=1.4–1.7 (more preferably n=1.4 to 1.5) provided over the layer comprising Ag and over the second dielectric layer; and wherein the coated article has a visible transmission of at least 70%, a sheet resistance ($R_s$)<=20 ohms/sq., and color characterized by a transmissive a* value from −4.0 to +2.0, a transmissive b* value from −5.0 to +3.0, a glass side reflective a* value from −4.0 to +3.0, and a glass side reflective b* value from −6.0 to +4.0.

DETAILED DESCRIPTION EXAMPLE EMBODIMENTS OF THE INVENTION

The instant invention relates to coated articles which may be used in applications including but not limited to vehicle windows, architectural windows (e.g., IG unit and/or monolithic windows), skylight windows, and/or the like. Coated articles according to this invention include an improved anti-reflection layer(s) system for reducing visible reflectance and/or increasing visible transmission in coated articles that provide solar control (e.g., IR and/or UV reflection) functionality. Surprisingly, in certain example embodiments it has been found that certain anti-reflection layer(s) systems of the instant invention can both: (a) improve visible transmission and/or reduce visible reflectance, while at the same time (b) achieving a neutral, or more neutral, color of the resulting coated article. Coated articles according to different embodiments of this invention may or may not be heat treated in different applications of the invention.

Figure 2:
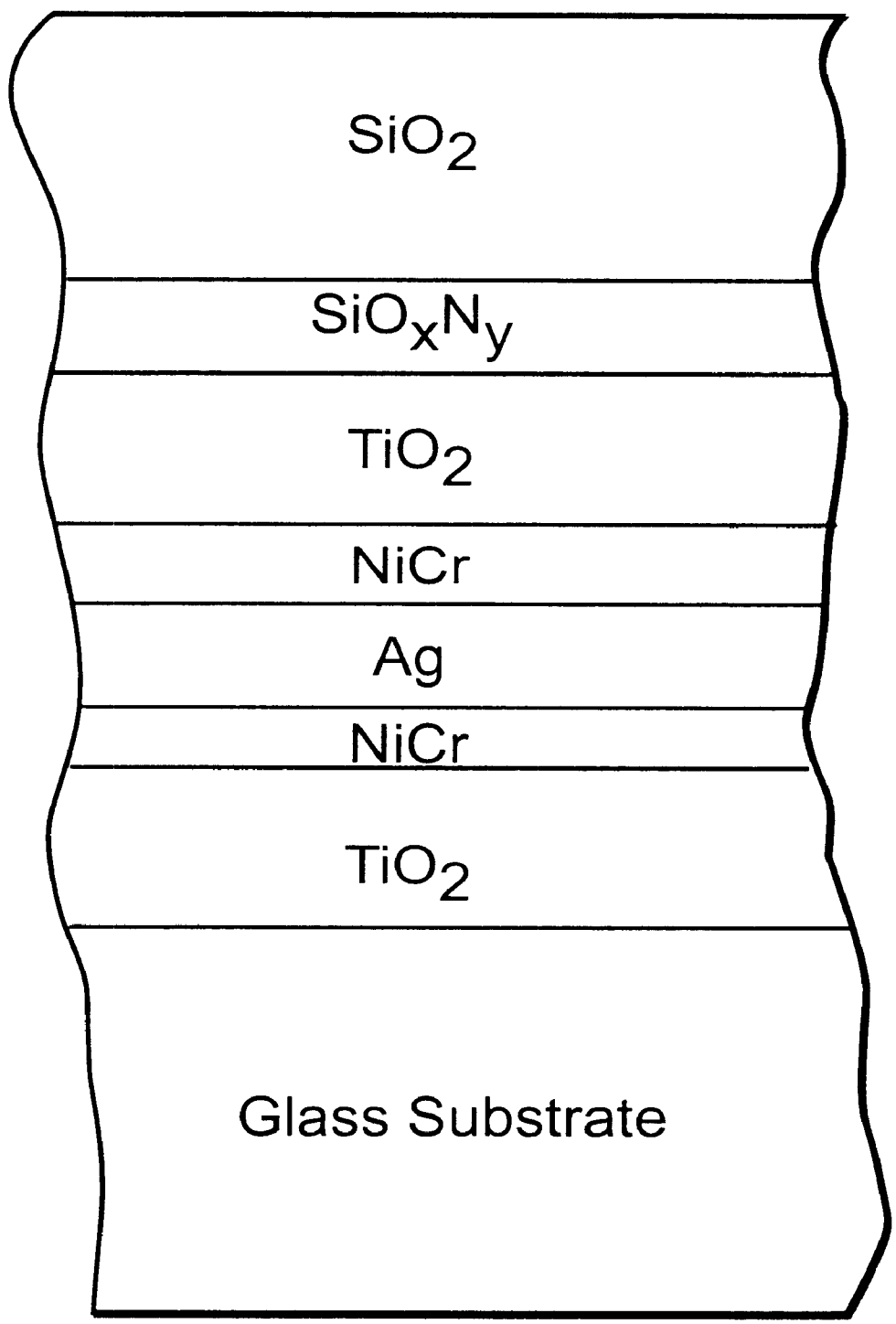
FIG. 2 is a cross sectional view of a coated article according to an embodiment of this invention.

FIG. 2 is a cross sectional view of a coated article according to an embodiment of this invention. The coated article of FIG. 2 includes a coating including, from the glass substrate outwardly (all indices of refraction at 550 nm):

glass (n=1.51 at 550)

titanium oxide (e.g., $TiO_2$) (n=2.1 to 2.7)

nickel-chromium (NiCr)

silver (Ag)

nickel-chromium (NiCr)

titanium oxide (e.g., $TiO_2$) (n=2.1 to 2.7)

silicon oxynitride ($SiO_xN_y$) (n=1.45 to 2.0, preferably n=1.6–1.9)

silicon oxide (e.g., $SiO_2$) (n=1.4 to 1.7; preferably n=1.45)

air (n=1.0)

As shown in FIG. 2, the contact layers (i.e., NiCr layers) surround and contact the IR reflecting Ag layer. The NiCr contact layers provide the most immediate chemical protection for the Ag layer, and also serve as adhesion and/or nucleation layers. Herein, the NiCr layers are referred to as "contact" layers since the contact the IR reflection layer (i.e., the Ag layer). Instead of Ag, other IR reflecting materials (e.g., Au) may be used for the IR reflecting layer (this applies to all embodiments herein). The thickness of the metallic Ag layer (IR reflecting layer) is chosen in order to achieve the desired thermal performance (e.g., the Ag layer may be from about 30–200 Å thick, more preferably from about 50–160 Å thick, in order to achieve sheet resistance ($R_s$) of less than 25 ohms/square, more preferably less than 20 ohms/square, and most preferably from 2–15 ohms/square.

While NiCr is illustrated as the material used for the contact layers, other materials may instead be used for the contact layers in alternative embodiments of this invention. Such other contact layer materials include, but are not limited to, $NiCrO_x$, $NiCrN_x$, $NiCrO_xN_y$, Ni, Cr, $CrN_x$, $NiO_x$, $TiO_x$, $NbO_x$, ZnO, $Al_2O_3$, $ZnAlO_x$, any combination(s) thereof, or any other suitable material(s) (this applies to all embodiments herein). With respect to all embodiments herein, each contact layer (e.g., NiCr in FIG. 2) may be from about 3–30 Å thick, more preferably from about 5–20 Å thick, and most preferably from about 7–15 Å thick. The contact layer(s) may or may not be continuous in different embodiments of this invention. In certain example embodiments (see the figures herein), a pair of contact layers surrounds the Ag layer. However, in alternative embodiments of this invention, the lower contact layer is optional and need not be present.

The lower substantially transparent titanium oxide layer provides anti-reflection and/or color modification functions. Optionally, the titanium oxide layer(s) herein may be replaced with SiZrN, or any other suitable dielectric which enables the same results to be obtained (this applies to all embodiments herein).

In general, the FIG. 2 anti-reflection system includes the bottom titanium oxide layer and the substantially transparent dielectrics provided on top of the NiCr and Ag layers, namely the top titanium oxide layer, silicon oxynitride layer, and silicon oxide layer. By gradually decreasing the respective indices of refraction "n" from the top NiCr layer (i.e.; top contact layer) outwardly toward the air, the anti-reflection system of FIG. 2 enables reduced visible reflection and thus increased visible transmission to be achieved. The use of silicon oxynitride is particularly useful as it can be deposited in different manners (i.e., by adjusting oxygen and nitrogen gas flows during the sputtering process) so as to achieve any desired index of refraction n from 1.45 up to 2.0, more preferably from 1.6 to 1.9, and most preferably an index of refraction n from 1.65 to 1.85. In a similar manner, the use of titanium oxide ($TiO_x$, x being from 1.5 to 2.5, e.g., x=2) is also useful as its index of refraction n can be varied from 2.1 to 2.7 (more preferably from 2.4 to 2.65) depending upon, for example, microstructure changes, e.g., the index n of titanium oxide can vary as a function of crystalline structure and/or packing density in the layer. Such microstructure changes can be caused by adjustment of oxygen gas flow during the sputtering process of the layer, pressure adjustments, substrate temperatures, post-treatment (e.g., heat treatment), deposition rate, angle of incidence, and/or substrate surface conditions. Surprisingly, as will be shown below in the Examples of this embodiment, the anti-reflection system also enables color of the coated article (i.e., transmissive and/or glass side reflective color) to move more toward neutral (i.e., a* and/or b* is closer to zero, or some other neutral color target such as transmissive a*=−2 and transmissive b*=−3.4, than in comparative example CE). With respect to reflective color, some in the art consider reflective a*=−1 and b*=−1.5 to be the ultimate neutral target, thus herein both a reflective color target of a*=−1 and b*=−1.5, and a reflective color target of a*=0 and b*=0 can be considered "neutral" targets. Other neutral targets may also be set or used in different embodiments of this invention. Of course, these targets need not be met for neutral color to be achieved.

It has also been found, with respect to any and all embodiments herein, that it is often desirable for the dielectric undercoat (i.e., bottom titanium oxide layer in FIG. 2) to have an index of refraction n greater than that of the overall weighted average index of the overcoat (overcoat refers to all layers above the top NiCr contact layer). It has also been found that lower indices of refraction for the dielectric overcoat and undercoat are often desirable for thinner Ag layers. As with all embodiments herein, the illustrated layers are preferably deposited/formed via sputtering, although other deposition techniques may certainly be used in alternative embodiments of this invention.

It is noted that the substrate is preferably of glass. The glass substrate may be clear or colored (e.g., green, grey, etc.) in different embodiments of the invention, and may be from about 1–10 mm thick, more preferably from 1–4 mm thick.

EXAMPLE(S) OF FIG. 2 EMBODIMENT

The Tables below illustrate Example(s) (Ex.) of the FIG. 2 embodiment, compared to a Comparative Example(s) (CE) similar to prior art FIG. 1 of the instant application. Example A (Ex. A) of the FIG. 2 embodiment should be compared to Comparative Example A (CE A), since they both have the same basic solar control layers (i.e., the Ag and NiCr thicknesses and arrangement are the same in both). Likewise, Example B (Ex. B) of the FIG. 2 embodiment should be compared to Comparative Example B (CE B), since they both have the same basic solar control layers (i.e., the Ag and NiCr thicknesses and arrangement are the same in both). For these simulation examples in the Tables below, the following indices of refraction were assumed: for glass, n=1.51; for $Si_3N_4$, n=2.0; for $SiO_xN_y$, n=1.72; for $SiO_2$, n=1.45; and for $TiO_2$, n=2.47, all at 550 nm.

FIRST TABLE: LAYER STRUCTURE (FIG. 2 embodiment)

|  | Glass | $TiO_2$ | $Si_3N_4$ | NiCr | Ag | NiCr | $TiO_2$ | $Si_3N_4$ | $SiO_xN_y$ | $SiO_2$ |
|---|---|---|---|---|---|---|---|---|---|---|
| Ex. A: | 3.7 mm | 213Å | 0Å | 9Å | 160Å | 9Å | 224Å | 0Å | 78Å | 316Å |
| CE A: | 3.7 mm | 208Å | 52Å | 9Å | 160Å | 9Å | 0Å | 508Å | 0Å | 0Å |
| Ex. B: | 3.7 mm | 302Å | 0Å | 9Å | 120Å | 9Å | 221Å | 0Å | 50Å | 377Å |
| CE B: | 3.7 mm | 216Å | 0Å | 9Å | 120Å | 9Å | 0Å | 456Å | 0Å | 0Å |

SECOND TABLE: OPTICAL PERFORMANCE (FIG. 2 embodiment)

|  | $T_{vis}$ | $a^*_t$ | $b^*_t$ | $R_{glass\ side\ (g)}$ | $a^*_g$ | $b^*_g$ | $R_{film\ side\ (f)}$ | $a^*f$ | $b^*f$ |
|---|---|---|---|---|---|---|---|---|---|
| Ex. A: | 72.4% | −3.3 | −2.1 | 10.9% | 2.4 | −2.0 | 4.9% | 11.8 | −7.3 |
| CE A: | 69.4% | −4.1 | −0.1 | 12.3% | 4.2 | −2.6 | 7.0% | 12.8 | −11.5 |
| Ex. B: | 78.9% | −2.1 | −2.4 | 5.2% | −1.4 | −1.2 | 3.3% | 2.2 | −1.7 |
| CE B: | 74.5% | −2.3 | −2.1 | 7.1% | −0.1 | −1.0 | 3.0% | 7.2 | −3.2 |

It can be seen from the Tables above regarding the FIG. 2 embodiment of this invention, that the anti-reflection system of the instant invention enables not only better transmission characteristics (i.e., increased transmission %) and better reflection characteristics (i.e., reduced glass side reflection ($R_g$)), but surprisingly also at the same time provides color values which moved more toward the neutral (the ultimate neutral is a*=0 and b*=0). In particular, Ex. A had better visible transmission (higher $T_{vis}$) than CE A; Ex. A had better glass side reflection (lower $R_g$) than CE A; and Ex. A had $a^*_t$ (transmissive a*) and $a^*_g$ (glass side reflective a*) values closer to neutral (i.e., closer to zero, or some other neutral color target such as transmissive a*=−2 and transmissive b*=−3.4), as a result of the anti-reflection layer system of the FIG. 2 embodiment.

Figure 3:
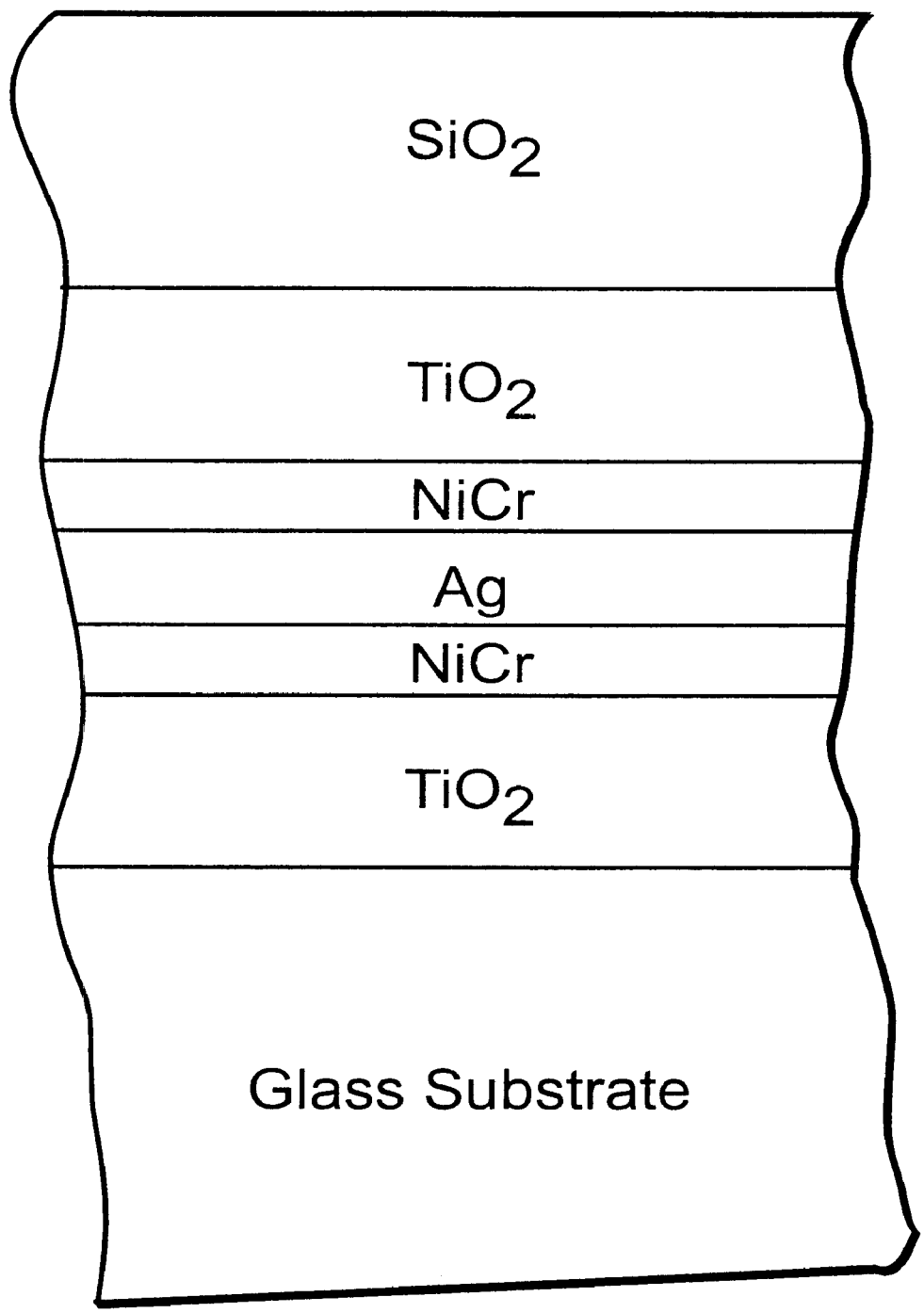
FIG. 3 is a cross sectional view of a coated article according to another embodiment of this invention.

FIG. 3 is a cross sectional view of a coated article according to another embodiment of this invention. The coated article of FIG. 3 includes a coating including, from the glass substrate outwardly (all indices n at 550 nm):

glass (n=1.51)
titanium oxide (e.g., $TiO_2$) (n=2.1 to 2.7)
nickel-chromium (NiCr)
silver (Ag)
nickel-chromium (NiCr)
titanium oxide (e.g., $TiO_2$) (n=2.1 to 2.7)
silicon oxide (e.g., $SiO_2$) (n=1.4 to 1.7, preferably n=1.45)
air (n=1.0)

The FIG. 3 anti-reflection system includes the bottom titanium oxide layer and the dielectrics provided on top of the NiCr and Ag layers, namely the top titanium oxide layer and the silicon oxide layer. By gradually decreasing the respective indices of refraction "n" from the top NiCr layer (i.e., top contact layer) outwardly toward the air, the anti-reflection system enables reduced visible reflection and thus increased visible transmission to be achieved. The use of titanium oxide ($TiO_x$, x being from 1.5 to 2.5, e.g., x=2) is also useful as its index of refraction n can be varied from 2.1 to 2.7 (more preferably from 2.4 to 2.65). Surprisingly, as will be shown below in the Example(s) of this embodiment, the anti-reflection system also enables color of the coated article (i.e., transmissive and/or glass side reflective) to move more toward neutral (i.e., a* and/or b* is closer to zero, or some other neutral color target such as transmissive a*=−2 and transmissive b*=−3.4, as compared to a comparative example CE similar to FIG. 1). With respect to reflective color, some in the art consider reflective a*=−1 and b*=−1.5 to be the ultimate neutral, thus herein both a reflective color target of a*=−1 and b*=−1.5, and a reflective color target of a*=0 and b*=0 can be considered "neutral" colors.

EXAMPLE(S) OF FIG. 3 EMBODIMENT

The Tables below illustrate Example(s) (Ex.) of the FIG. 3 embodiment, compared to a Comparative Example(s) (CE) similar to prior art FIG. 1 of the instant application. Example A (Ex. A) of the FIG. 3 embodiment should be compared to Comparative Example A (CE A), since they both have the same basic solar control layers (i.e., the Ag and NiCr thicknesses and arrangement are the same in both). Likewise, Example B (Ex. B) of the FIG. 3 embodiment should be compared to Comparative Example B (CE B), since they both have the same basic solar control layers (i.e., the Ag and NiCr thicknesses and arrangement are the same in both). For these simulation examples in the Tables below, the following indices of refraction were assumed: for glass, n=1.51; for $Si_3N_4$, n=2.0; for $SiO_xN_y$, n=1.72; for $SiO_2$, n=1.45; and for $TiO_2$, n=2.47, all at 550 nm.

which moved more toward the neutral (the ultimate neutral is a*=0 and b*=0) relative to the Comparative Example (CE). In particular, Ex. A had better visible transmission (higher $T_{vis}$) than CE A; Ex. A had better glass side reflection (lower $R_g$) than CE A; and Ex. A had a*$_t$ (transmissive a*) and a*$_g$ (glass side reflective a*) values closer to neutral as a result of the anti-reflection layer system of the FIG. 3 embodiment.

Figure 4:
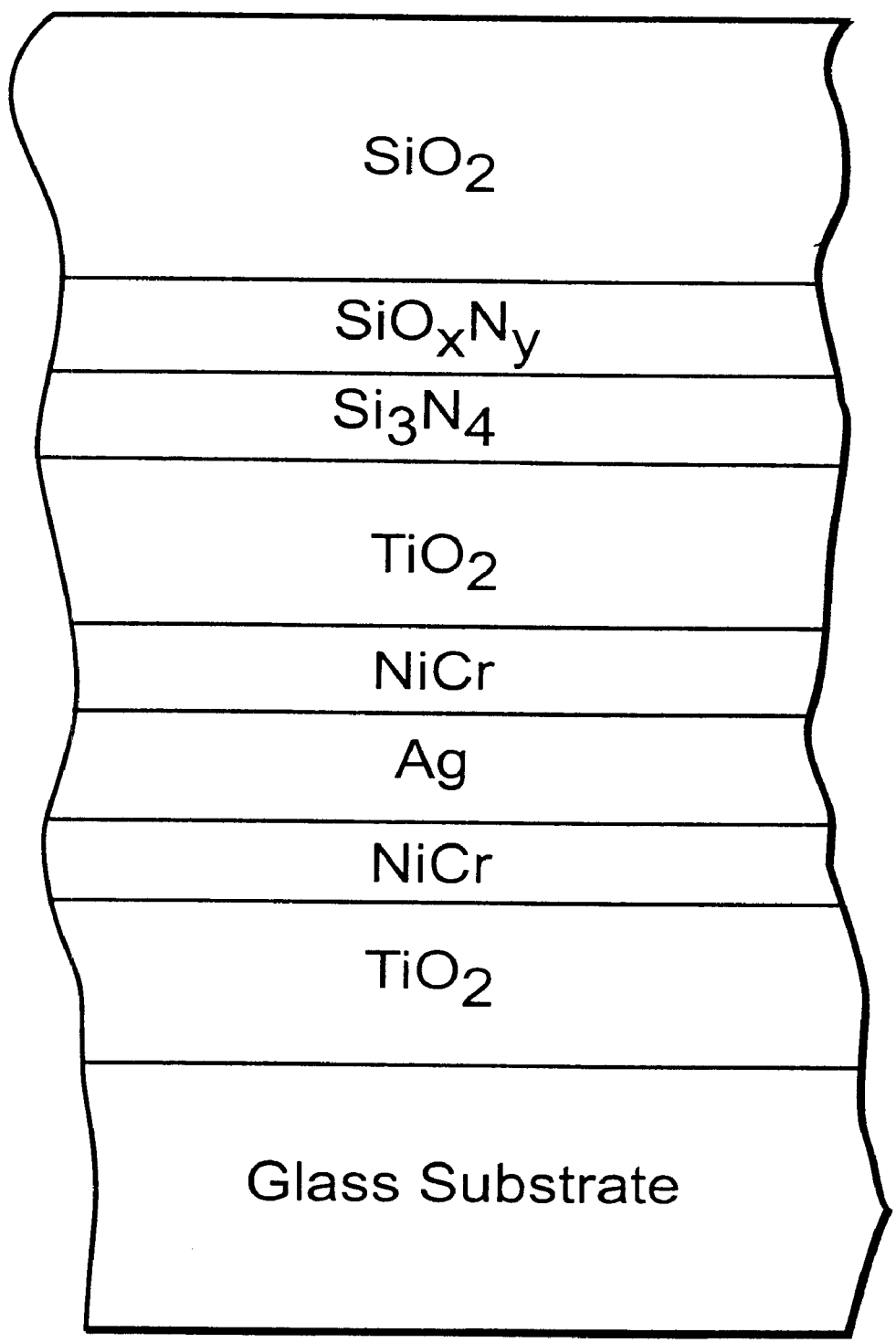
FIG. 4 is a cross sectional view of a coated article according to another embodiment of this invention.

FIG. 4 is a cross sectional view of a coated article according to another embodiment of this invention. The coated article of FIG. 4 includes a coating including, from the glass substrate outwardly (all indices at 550 nm):

glass (n=1.51)
titanium oxide (e.g., $TiO_2$) (n=2.1 to 2.7)
nickel-chromium (NiCr)
silver (Ag)
nickel-chromium (NiCr)
titanium oxide (e.g., $TiO_2$) (n=2.1 to 2.7)
silicon nitride (e.g., $Si_3N_4$) (n=1.8 to 2.2, preferably n=2.0)
silicon oxynitride ($SiO_xN_y$) (n=1.45 to 2.0, preferably n=1.6–1.9)
silicon oxide (e.g., $SiO_2$) (n=1.4 to 1.7, preferably n=1.45)
air (n=1.0)

The FIG. 4 anti-reflection system includes the bottom titanium oxide layer and the dielectrics provided on top of the NiCr and Ag layers, namely the top titanium oxide layer, the silicon nitride layer (e.g., $Si_3N_4$, or any other suitable non-stoichiometric form of silicon nitride depending upon the index n desired), the silicon oxynitride layer, and the silicon oxide layer. By progressively (gradually) decreasing the respective indices of refraction "n" from the top NiCr layer (i.e., top contact layer) outwardly toward the air, the anti-reflection system enables reduced visible reflection and thus increased visible transmission to be achieved. The use of titanium oxide ($TiO_x$, x being from 1.5 to 2.5, e.g., x=2)

FIRST TABLE: LAYER STRUCTURE (FIG. 3 embodiment)

|  | Glass | $TiO_2$ | $Si_3N_4$ | NiCr | Ag | NiCr | $TiO_2$ | $Si_3N_4$ | $SiO_xN_y$ | $SiO_2$ |
|---|---|---|---|---|---|---|---|---|---|---|
| Ex. A: | 3.7 mm | 310Å | 0Å | 9Å | 160Å | 9Å | 265Å | 0Å | 0Å | 659Å |
| CE A: | 3.7 mm | 208Å | 52Å | 9Å | 160Å | 9Å | 0Å | 508Å | 0Å | 0Å |
| Ex. B: | 3.7 mm | 257Å | 0Å | 9Å | 140Å | 9Å | 227Å | 0Å | 0Å | 390Å |
| CE B: | 3.7 mm | 134Å | 101Å | 9Å | 140Å | 9Å | 0Å | 478Å | 0Å | 0Å |

SECOND TABLE: OPTICAL PERFORMANCE (FIG. 3 embodiment)

|  | $T_{vis}$ | a*$_t$ | b*$_t$ | $R_{glass\ side\ (g)}$ | a*$_g$ | b*$_g$ | $R_{film\ side\ (f)}$ | a*f | b*f |
|---|---|---|---|---|---|---|---|---|---|
| Ex. A: | 72.3% | −3.3 | 0.9 | 12.0% | 3.9 | −2.6 | 9.3% | 5.8 | −13.9 |
| CE A: | 69.4% | −4.1 | −0.1 | 12.3% | 4.2 | −2.6 | 7.0% | 12.8 | −11.5 |
| Ex. B: | 76.5% | −2.6 | −2.6 | 6.6% | 1.2 | −1.8 | 3.2% | 8.4 | −3.5 |
| CE B: | 70.6% | −3.4 | −1.1 | 11.1% | 2.8 | −2.2 | 5.2% | 12.2 | −7.3 |

It can be seen from the Tables above regarding the FIG. 3 embodiment of this invention, that the anti-reflection system of the instant invention enables not only better transmission characteristics (i.e., increased transmission %) and better reflection characteristics (i.e., reduced glass side reflection ($R_g$)), but surprisingly also at the same time in Example A of the FIG. 3 embodiment provides color values is also useful as its index of refraction n can be varied from 2.1 to 2.7 (more preferably from 2.4 to 2.65). The index of silicon oxynitride is similarly variable. Thus, the index n of the silicon oxide is less than that of the silicon oxynitride, which is less than that of the silicon nitride, which is less than that of the titanium oxide. Surprisingly, as will be shown below in the Example(s) of this embodiment, the anti-reflection system also enables color of the coated article (i.e., transmissive and/or glass side reflective) to move more toward neutral.

EXAMPLE(S) OF FIG. 4 EMBODIMENT

The Tables below illustrate Example(s) (Ex.) of the FIG. 4 embodiment, compared to a Comparative Example(s) (CE) similar to prior art FIG. 1 of the instant application. Example A (Ex. A) of the FIG. 4 embodiment should be compared to Comparative Example A (CE A), since they both have the same basic solar control layers (i.e., the Ag and NiCr thicknesses and arrangement are the same in both). For these simulation examples in the Tables below, the following indices of refraction were assumed: for glass, n=1.51; for $Si_3N_4$, n=2.0; for $SiO_xN_y$, n=1.72; for $SiO_2$, n=1.45; and for $TiO_2$, n=2.47, all at 550 nm.

| FIRST TABLE: LAYER STRUCTURE (FIG. 4 embodiment) | | | | | | | | | |
|---|---|---|---|---|---|---|---|---|---|
| Glass | $TiO_2$ | $Si_3N_4$ | NiCr | Ag | NiCr | $TiO_2$ | $Si_3N_4$ | $SiO_xN_y$ | $SiO_2$ |
| Ex. A: 3.7 mm | 261Å | 0Å | 9Å | 140Å | 9Å | 183Å | 94Å | 39Å | 275Å |
| CE A: 3.7 mm | 134Å | 101Å | 9Å | 140Å | 9Å | 0Å | 478Å | 0Å | 0Å |

| SECOND TABLE: OPTICAL PERFORMANCE (FIG. 4 embodiment) | | | | | | | | |
|---|---|---|---|---|---|---|---|---|
| | $T_{vis}$ | $a^*_t$ | $b^*_t$ | $R_{glass\ side\ (g)}$ | $a^*_g$ | $b^*_g$ | $R_{film\ side\ (f)}$ | $a^*f$ | $b^*f$ |
| Ex. A: | 76.2% | −2.6 | −2.5 | 6.4% | 1.1 | −1.8 | 3.1% | 8.1 | −3.3 |
| CE A: | 70.6% | −3.4 | −1.1 | 11.1% | 2.8 | −2.2 | 5.2% | 12.2 | −7.3 |

It can be seen from the Tables above regarding the FIG. 4 embodiment of this invention, that the anti-reflection system of the instant invention enables not only better transmission characteristics (i.e., increased transmission %) and better reflection characteristics (i.e., reduced glass side reflection ($R_g$)), but surprisingly also at the same time in Example A of the FIG. 4 embodiment provides color values which moved more toward the neutral relative to the Comparative Example (CE). In particular, Ex. A had better visible transmission (higher $T_{vis}$) than CE A; Ex. A had better glass side reflection (lower $R_g$) than CE A; and Ex. A had $a^*_t$ (transmissive $a^*$) and $a^*_g$ (glass side reflective $a^*$) color values closer to neutral as a result of the anti-reflection layer system of the FIG. 4 embodiment.

Figure 5:
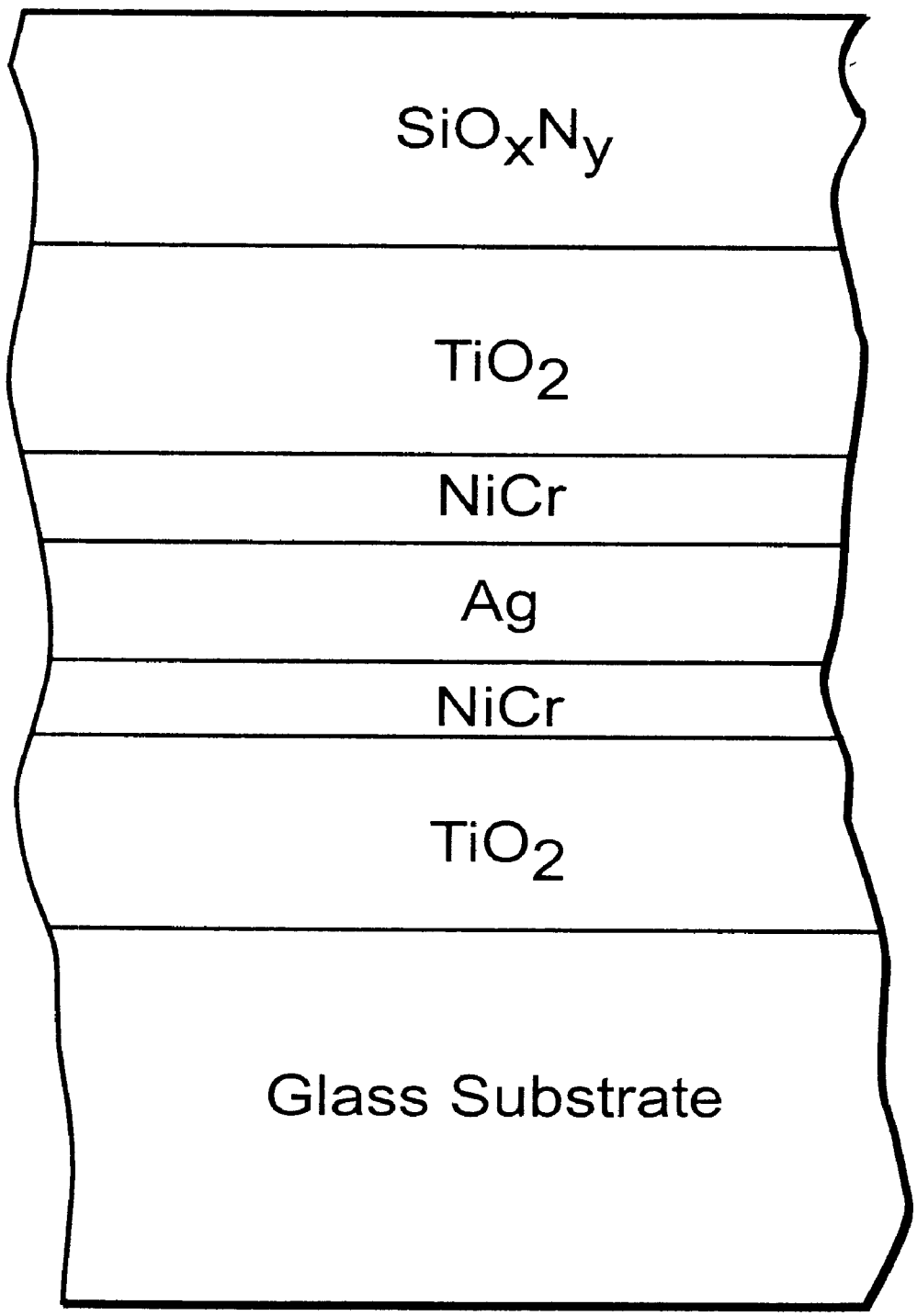
FIG. 5 is a cross sectional view of a coated article according to another embodiment of this invention.

FIG. 5 is a cross sectional view of a coated article according to another embodiment of this invention. The coated article of FIG. 5 includes a coating including, from the glass substrate outwardly (all indices at 550 nm):

glass (n=1.51)
titanium oxide (e.g., $TiO_2$) (n=2.1 to 2.7)
nickel-chromium (NiCr)
silver (Ag)
nickel-chromium (NiCr)
titanium oxide (e.g., $TiO_2$) (n=2.1 to 2.7)
silicon oxynitride ($SiO_xN_y$)(n=1.45 to 2.0, preferably n=1.6–1.9)
air (n=1.0)

The FIG. 5 anti-reflective system includes the bottom titanium oxide layer and the dielectrics provided on top of the NiCr and Ag layers, namely the top titanium oxide layer and the silicon oxynitride layer. By gradually decreasing the respective indices of refraction "n" from the top NiCr layer (i.e., top contact layer) outwardly toward the air, the anti-reflection system enables reduced visible reflection and thus increased visible transmission to be achieved. The use of titanium oxide ($TiO_x$, x being from 1.5 to 2.5, e.g., x=2) is also useful as its index of refraction n can be varied from 2.1 to 2.7 (more preferably from 2.4 to 2.65). The index of refraction of the silicon oxynitride layer is similarly variable as discussed above. Surprisingly, as will be shown below in the Example(s) of this embodiment, the anti-reflection system also enables color of the coated article (i.e., transmissive and/or glass side reflective) to move more toward neutral.

EXAMPLE(S) OF FIG. 5 EMBODIMENT

The Tables below illustrate Example(s) (Ex.) of the FIG. 5 embodiment, compared to a Comparative Example(s) (CE) similar to prior art FIG. 1 of the instant application. Example A (Ex. A) of the FIG. 5 embodiment should be compared to Comparative Example A (CE A), since they both have the same basic solar control layers (i.e., the Ag and NiCr thicknesses and arrangement are the same in both). For these simulation examples in the Tables below, the following indices of refraction were assumed: for glass, n=1.51; for $Si_3N_4$, n=2.0; for $SiO_xN_y$, n=1.72; for $SiO_2$, n=1.45; and for $TiO_2$, n=2.47, all at 550 nm.

| FIRST TABLE: LAYER STRUCTURE (FIG. 5 embodiment) | | | | | | | | | |
|---|---|---|---|---|---|---|---|---|---|
| Glass | $TiO_2$ | $Si_3N_4$ | NiCr | Ag | NiCr | $TiO_2$ | $Si_3N_4$ | $SiO_xN_y$ | $SiO_2$ |
| Ex. A: 3.7 mm | 256Å | 0Å | 9Å | 140Å | 9Å | 176Å | 0Å | 333Å | 0Å |
| CE A: 3.7 mm | 134Å | 101Å | 9Å | 140Å | 9Å | 0Å | 478Å | 0Å | 0Å |

SECOND TABLE: OPTICAL PERFORMANCE (FIG. 5 embodiment)

|  | $T_{vis}$ | $a^*_t$ | $b^*_t$ | $R_{glass\ side\ (g)}$ | $a^*_g$ | $b^*_g$ | $R_{film\ side\ (f)}$ | $a^*f$ | $b^*f$ |
|---|---|---|---|---|---|---|---|---|---|
| Ex. A: | 76.3% | −2.6 | −2.5 | 6.5% | 1.3 | −1.8 | 3.2% | 8.8 | −3.5 |
| CE A: | 70.6% | −3.4 | −1.1 | 11.1% | 2.8 | −2.2 | 5.2% | 12.2 | −7.3 |

It can be seen from the Tables above regarding the FIG. 5 embodiment of this invention, that the anti-reflection system of the instant invention enables not only better transmission characteristics (i.e., increased transmission %) and better reflection characteristics (i.e., reduced glass side reflection ($R_g$)), but surprisingly also at the same time Example A of the FIG. 5 embodiment provides color values which moved more toward the neutral (the ultimate neutral is $a^*=0$ and $b^*=0$, or alternatively some other rather neutral target as discussed above) relative to the Comparative Example (CE). In particular, Ex. A had better visible transmission (higher $T_{vis}$) than CE A; Ex. A had better glass side reflection (lower $R_g$) than CE A; and Ex. A had $a^*_t$ (transmissive $a^*$) and $a^*_g$ (glass side reflective $a^*$) values closer to neutral as a result of the anti-reflection layer system of the FIG. 5 embodiment.

Figure 6:
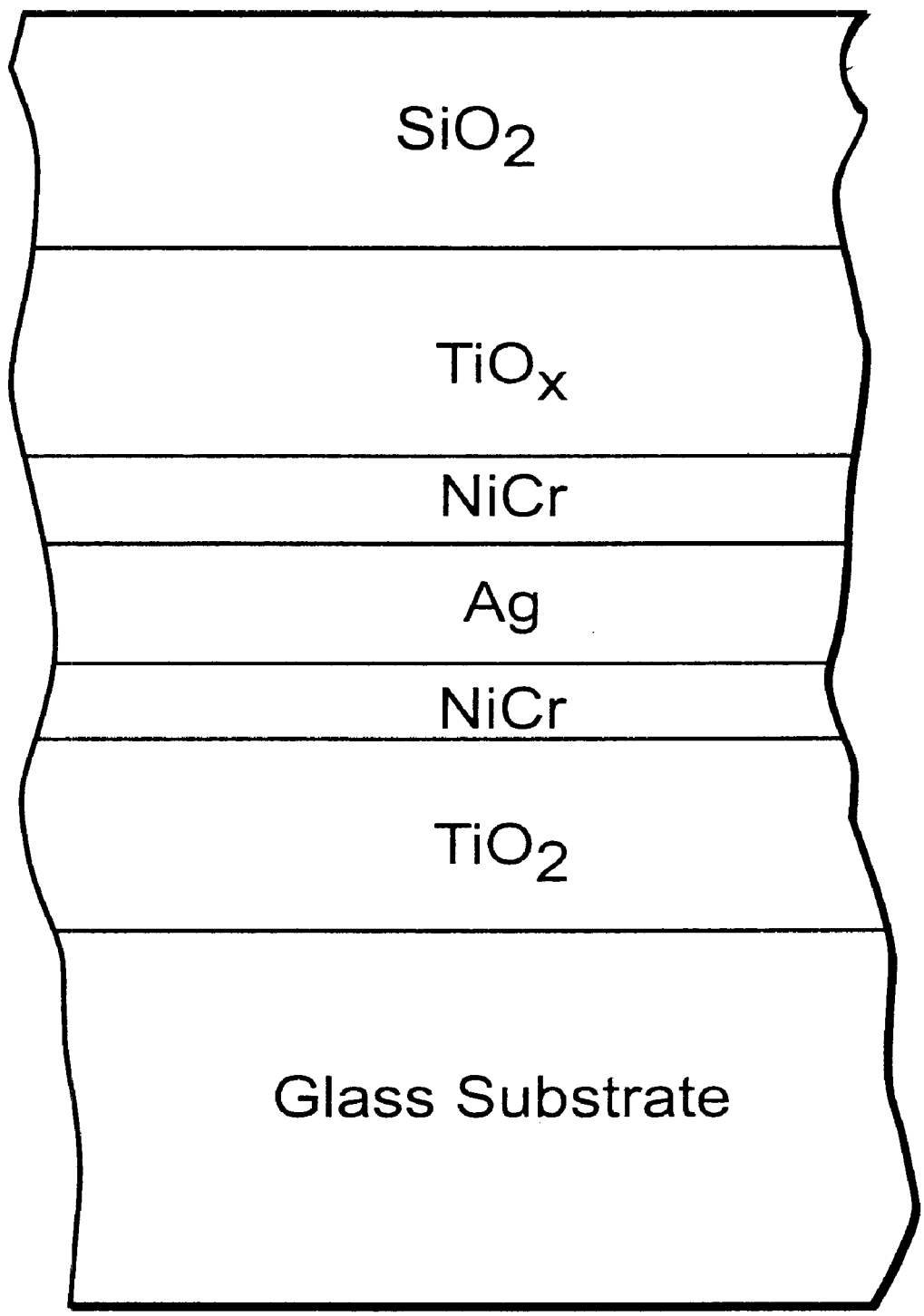
FIG. 6 is a cross sectional view of a coated article according to another embodiment of this invention.

FIG. 6 is a cross sectional view of a coated article according to another embodiment of this invention. The FIG. 6 embodiment differs from the FIG. 3 embodiment, in that the upper titanium oxide layer is $TiO_x$ where x may be different in different embodiments of the invention. The coated article of FIG. 6 includes a coating including, from the glass substrate outwardly (all indices n at 550 nm):

glass (n=1.51)

titanium oxide (e.g., $TiO_2$) (n=2.1 to 2.7)

nickel-chromium (NiCr)

silver (Ag)

nickel-chromium (NiCr)

$TiO_x$ (n=2.1 to 2.7)

silicon oxide (e.g., $SiO_2$) (n=1.4 to 1.7, preferably n=1.45)

air (n=1.0)

The FIG. 6 anti-reflection system includes the bottom titanium oxide layer and the dielectrics provided on top of the NiCr and Ag layers, namely the top titanium oxide layer and the silicon oxide layer. By gradually decreasing the respective indices of refraction "n" from the top NiCr layer (i.e., top contact layer) outwardly toward the air, the anti-reflection system enables reduced visible reflection and thus increased visible transmission to be achieved. The type of titanium oxide may be different in different embodiments of this invention ($TiO_x$, x being from 1.5 to 2.5, e.g., x=2). In addition, irrespective of x, the microstructure of the titanium oxide layer may optionally be changed in order to change its index of refraction n, which can be varied from 2.1 to 2.7 (more preferably from 2.4 to 2.65). Surprisingly, as will be shown below in the Example(s) of this embodiment, the anti-reflection system also enables color of the coated article (i.e., transmissive and/or glass side reflective) to move more toward neutral.

EXAMPLE(S) OF FIG. 6 EMBODIMENT

The Tables below illustrate Examples (Exs. A–C) of the FIG. 6 embodiment, compared to a Comparative Example(s) (CE) similar to prior art FIG. 1 of the instant application. Each of the different Examples A–C utilized a top titanium oxide layer with a different index of refraction. In particular, in Ex. A the index of refraction of the top titanium oxide layer was n=2.47, while in Ex. B the index of refraction of the top titanium oxide layer was n=2.57, and in Ex. C the index of refraction of the top titanium oxide layer was n=2.65. Examples A–C should be compared to Comparative Example (CE), since they all have the same basic solar control layers (i.e., the Ag and NiCr thicknesses and arrangement are the same in both). For these simulation examples in the Tables below, the following indices of refraction were assumed: for glass, n=1.51; for $Si_3N_4$, n=2.0; for $SiO_xN_y$, n=1.72; for $SiO_2$, n=1.45; and for the bottom $TiO_2$, n=2.47, all at 550 nm (the index n of the top titanium oxide layer varied as discussed above).

FIRST TABLE: LAYER STRUCTURE (FIG. 6 embodiment)

|  | Glass | $TiO_2$ | $Si_3N_4$ | NiCr | Ag | NiCr | $TiO_x$ | $Si_3N_4$ | $SiO_xN_y$ | $SiO_2$ |
|---|---|---|---|---|---|---|---|---|---|---|
| Ex. A: | 3.7 mm | 257Å | 0Å | 9Å | 140Å | 9Å | 227Å | 0Å | 0Å | 390Å |
| Ex. B: | 3.7 mm | 258Å | 0Å | 9Å | 140Å | 9Å | 216Å | 0Å | 0Å | 396Å |
| Ex. C: | 3.7 mm | 258Å | 0Å | 9Å | 140Å | 9Å | 213Å | 0Å | 0Å | 397Å |
| CE: | 3.7 mm | 134Å | 101Å | 9Å | 140Å | 9Å | 0Å | 478Å | 0Å | 0Å |

SECOND TABLE: OPTICAL PERFORMANCE (FIG. 6 embodiment)

|  | $T_{vis}$ | $a^*_t$ | $b^*_t$ | $R_{glass\ side\ (g)}$ | $a^*_g$ | $b^*_g$ | $R_{film\ side\ (f)}$ | $a^*f$ | $b^*f$ |
|---|---|---|---|---|---|---|---|---|---|
| Ex. A: | 76.5% | −2.6 | −2.6 | 6.6% | 1.2 | −1.8 | 3.2% | 8.4 | −3.5 |
| Ex. B: | 77.4% | −2.3 | −2.7 | 5.7% | −0.3 | −1.7 | 3.1% | 5.0 | −2.3 |
| Ex. C: | 77.9% | −2.2 | −2.8 | 5.5% | −1.5 | −1.2 | 3.3% | 2.8 | −1.8 |
| CE: | 70.6% | −3.4 | −1.1 | 11.1% | 2.8 | −2.2 | 5.2% | 12.2 | −7.3 |

It can be seen from the Tables above regarding the FIG. 6 embodiment of this invention, that the anti-reflection system of the instant invention enables not only better transmission characteristics (i.e., increased transmission %) and better reflection characteristics (i.e., reduced glass side reflection ($R_g$)), but surprisingly also at the same time provides color values which moved more toward the neutral relative to the Comparative Example (CE). In particular, each of Examples A–C had better visible transmission (higher $T_{vis}$) than the Comparative Example CE; had better glass side reflection (lower $R_g$) than the CE; and had $a^*_t$ (transmissive a*) and $a^*_g$ (glass side reflective a*) values close to neutral as a result of the anti-reflection layer system of the FIG. 6 embodiment.

Further with respect to the FIG. 6 embodiment, it can be seen that optical performance improves as the index n of the titanium oxide layer progressively increases from 2.47 (Ex. A) to 2.57 (Ex. B), and then to 2.65 (Ex. C). In this regard, Ex. C had the best visible transmission (i.e., highest) and the lowest glass side reflection (lowest) of the three examples. Example C also had the best a* color values for neutral color. Thus, it can be seen that in certain embodiments of the FIG. 6 embodiment, it is desirable to have the index n of the titanium oxide layer ($TiO_x$) at a value from n=2.55 to 2.70, more preferably from 2.6 to 2.7 in certain example embodiments.

Figure 7:
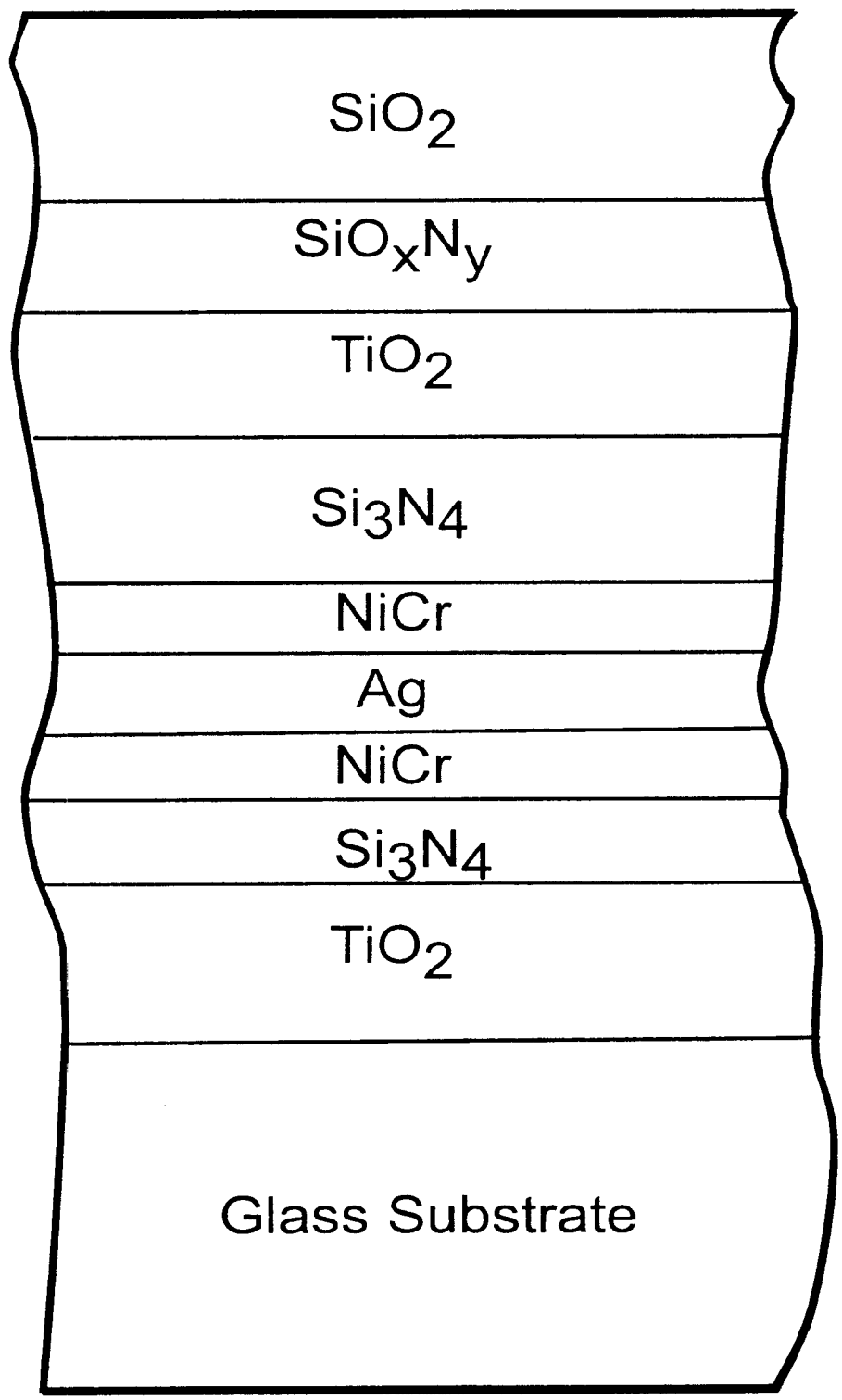
FIG. 7 is a cross sectional view of a coated article according to another embodiment of this invention.

FIG. 7 is a cross sectional view of a coated article according to another embodiment of this invention. The coated article of FIG. 7 includes a coating including, from the glass substrate outwardly (all indices at 550 nm):

glass (n=1.51)

titanium oxide (e.g., $TiO_2$) (n=2.1 to 2.7)

silicon nitride (e.g., $Si_3N_4$) (n=1.8 to 2.2, preferably n=2.0)

nickel-chromium (NiCr)

silver (Ag)

nickel-chromium (NiCr)

silicon nitride (e.g., $Si_3N_4$) (n=1.8 to 2.2, preferably n=2.0)

titanium oxide (e.g., $TiO_2$) (n=2.1 to 2.7)

silicon oxynitride ($SiO_xN_y$)(n=1.45 to 2.0, preferably n=1.6–1.9)

silicon oxide (e.g., $SiO_2$) (n=1.4 to 1.7, preferably n=1.45)

air (n=1.0)

The FIG. 7 anti-reflective system includes the bottom titanium oxide layer as well as the bottom silicon nitride layer (stoichiometric, or non-stoichiometric such as Si-rich), and the dielectrics provided on top of the NiCr and Ag layers, namely the top silicon nitride layer (stoichiometric, or non-stoichiometric such as Si-rich), the titanium oxide layer, the silicon oxynitride layer, and the silicon oxide layer. By gradually decreasing the respective indices of refraction "n" from the top NiCr layer (i.e., top contact layer) outwardly toward the air (except for the top silicon nitride layer), the anti-reflection system enables reduced visible reflection and thus increased visible transmission to be achieved. This embodiment illustrates that thin (e.g., from about 10–150Å thick, more preferably from about 30–70Å thick, and most preferably about 40–60Å thick) protective silicon nitride layers can be positioned on either side of the Ag layer so as to contact the respective contact NiCr layers, thereby sandwiching the NiCr contacts and the Ag layer therebetween. These additional silicon nitride layers can improve mechanical and/or chemical characteristics of the film, and surprisingly this does not cause significant loss of optical advantages associated with anti-reflection systems of the instant invention. For example, even with the presence of the protective silicon nitride layers of the FIG. 7 embodiment, the anti-reflection system still enables optical improvement (higher visible transmission), and has approximately the same color characteristics in many respects as the comparative example CE. Thus, this FIG. 7 embodiment enables mechanical and/or chemical durability to be improved (via the added silicon nitride protective layers), without sacrificing significant visible transmission or color performance improvement.

EXAMPLE(S) OF FIG. 7 EMBODIMENT

The Tables below illustrate Example(s) (Ex.) of the FIG. 7 embodiment, compared to a Comparative Example(s) (CE) similar to prior art FIG. 1 of the instant application. Example A (Ex. A) of the FIG. 7 embodiment should be compared to Comparative Example A (CE A), since they both have the same basic solar control layers (i.e., the Ag and NiCr thicknesses and arrangement are the same in both). For these simulation examples in the Tables below, the following indices of refraction were assumed: for glass, n=1.51; for $Si_3N_4$, n=2.0; for $SiO_xN_y$, n=1.72; for $SiO_2$, n=1.45; and for $TiO_2$, n=2.47, all at 550 nm.

FIRST TABLE: LAYER STRUCTURE (FIG. 7 embodiment)

| | Glass | $TiO_2$ | $Si_3N_4$ | NiCr | Ag | NiCr | $Si_3N_4$ | $TiO_2$ | $Si_3N_4$ | $SiO_xN_y$ | $SiO_2$ |
|---|---|---|---|---|---|---|---|---|---|---|---|
| Ex. A: | 3.7 mm | 232Å | 50Å | 9Å | 120Å | 9Å | 50Å | 162Å | 0Å | 62Å | 366Å |
| CE A: | 3.7 mm | 216Å | 0Å | 9Å | 120Å | 9Å | 0Å | 0Å | 456Å | 0Å | 0Å |

SECOND TABLE: OPTICAL PERFORMANCE (FIG. 7 embodiment)

| | $T_{vis}$ | $a^*_t$ | $b^*_t$ | $R_{glass\ side\ (g)}$ | $a^*_g$ | $b^*_g$ | $R_{film\ side\ (f)}$ | $a^*_f$ | $b^*_f$ |
|---|---|---|---|---|---|---|---|---|---|
| Ex. A: | 77.8% | −2.3 | −2.4 | 5.6% | 0.3 | −1.6 | 3.1% | 5.5 | −2.5 |
| CE A: | 74.5% | −2.3 | −2.1 | 7.1% | −0.1 | −1.0 | 3.0% | 7.2 | −3.2 |

It can be seen from the Tables above regarding the FIG. 7 embodiment of this invention, that the anti-reflection system of the instant invention enables not only better transmission characteristics (i.e., increased transmission %), but also better mechanical and/or chemical durability due to the presence of the protective silicon nitride layers.

$Si_3N_4$, n=2.0; for $SiO_xN_y$, n=1.72; for $SiO_2$, n=1.45; and for $TiO_2$, n=2.47, all at 550 nm.

Figure 8:
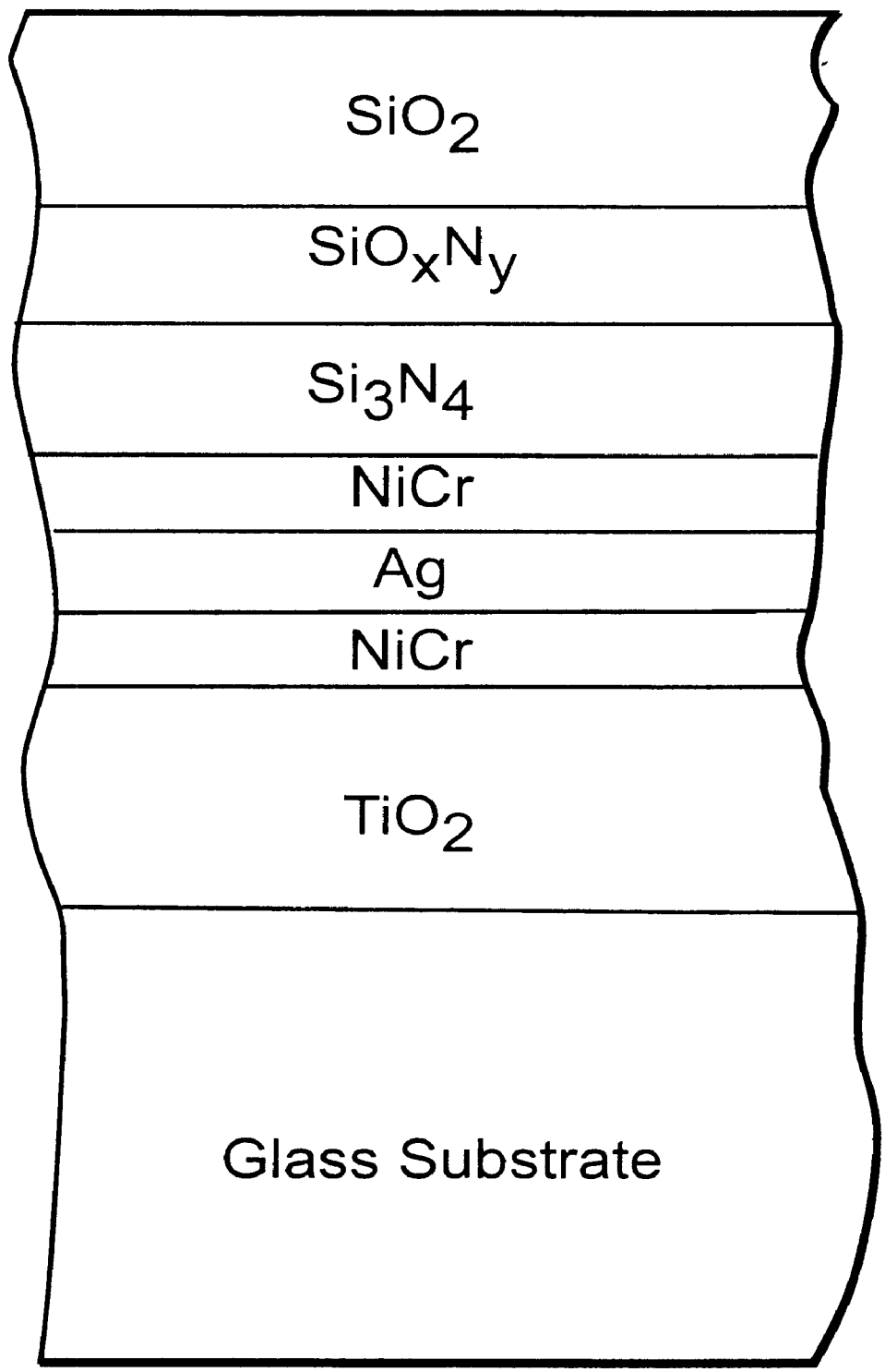
FIG. 8 is a cross sectional view of a coated article according to another embodiment of this invention.

FIRST TABLE: LAYER STRUCTURE (FIG. 8 embodiment)

|  | Glass | $TiO_2$ | $Si_3N_4$ | NiCr | Ag | NiCr | $TiO_2$ | $Si_3N_4$ | $SiO_xN_y$ | $SiO_2$ |
|---|---|---|---|---|---|---|---|---|---|---|
| Ex. A: | 3.7 mm | 310Å | 0Å | 9Å | 90Å | 9Å | 0Å | 230Å | 177Å | 239Å |
| CE A: | 3.7 mm | 302Å | 8Å | 9Å | 90Å | 9Å | 0Å | 508Å | 0Å | 0Å |

SECOND TABLE: OPTICAL PERFORMANCE (FIG. 8 embodiment)

|  | $T_{vis}$ | $a^*_t$ | $b^*_t$ | $R_{glass\ side\ (g)}$ | $a^*_g$ | $b^*_g$ | $R_{film\ side\ (f)}$ | $a^*_f$ | $b^*_f$ |
|---|---|---|---|---|---|---|---|---|---|
| Ex. A: | 78.6% | -2.1 | -1.8 | 4.5% | -0.3 | -0.9 | 4.7% | 2.0 | -1.8 |
| CE A: | 78.4% | -2.2 | -1.3 | 5.4% | -0.8 | -0.4 | 3.6% | 2.4 | -1.8 |

FIG. 8 is a cross sectional view of a coated article according to another embodiment of this invention. The coated article of FIG. 8 includes a coating including, from the glass substrate outwardly (all indices n at 550 nm):

glass (n=1.51)

titanium oxide (e.g., $TiO_2$) (n=2.1 to 2.7)

nickel-chromium (NiCr)

silver (Ag)

nickel-chromium (NiCr)

silicon nitride (e.g., $Si_3N_4$) (n=1.8 to 2.2, preferably n=2.0)

silicon oxynitride ($SiO_xN_y$)(n=1.45 to 2.0, preferably n=1.6–1.9)

silicon oxide (e.g., $SiO_2$) (n=1.4 to 1.7, preferably n=1.45)

air (n=1.0)

In the FIG. 8 anti-reflective system, by progressively decreasing the respective indices of refraction "n" from the dielectric (silicon nitride) adjacent the top NiCr layer (i.e., top contact layer) outwardly toward the air, the anti-reflection system enables reduced visible reflection and thus increased visible transmission to be achieved. As discussed above, the index of refraction n of the silicon oxynitride layer is variable so as to fit between the respective indices of the silicon oxide and the silicon nitride. Surprisingly, as will be shown below in the Example(s) of this embodiment, the anti-reflection system also enables color of the coated article (i.e., transmissive and/or glass side reflective) to move more toward neutral.

EXAMPLE(S) OF FIG. 8 EMBODIMENT

The Tables below illustrate Example(s) (Ex.) of the FIG. 8 embodiment, compared to a Comparative Example(s) (CE) similar to prior art FIG. 1 of the instant application. Example A (Ex. A) of the FIG. 8 embodiment should be compared to Comparative Example A (CE A), since they both have the same basic solar control layers (i.e., the Ag and NiCr thicknesses and arrangement are the same in both). For these simulation examples in the Tables below, the following indices of refraction were assumed: for glass, n=1.51; for It can be seen from the Tables above regarding the FIG. 8 embodiment of this invention, that the anti-reflection system of the instant invention enables not only better transmission characteristics (i.e., increased transmission %) and better reflection characteristics (i.e., reduced glass side reflection ($R_g$)), but surprisingly also at the same time Example A of the FIG. 8 embodiment provides color values which moved more toward the neutral relative to the Comparative Example (CE). In particular, Ex. A had better visible transmission (higher $T_{vis}$) than CE A; Ex. A had better glass side reflection (lower $R_g$) than CE A; and Ex. A had $a^*_t$ (transmissive $a^*$) and $a^*_g$ (glass side reflective $a^*$) values close to neutral as a result of the anti-reflection layer system of the FIG. 8 embodiment.

Figure 9:
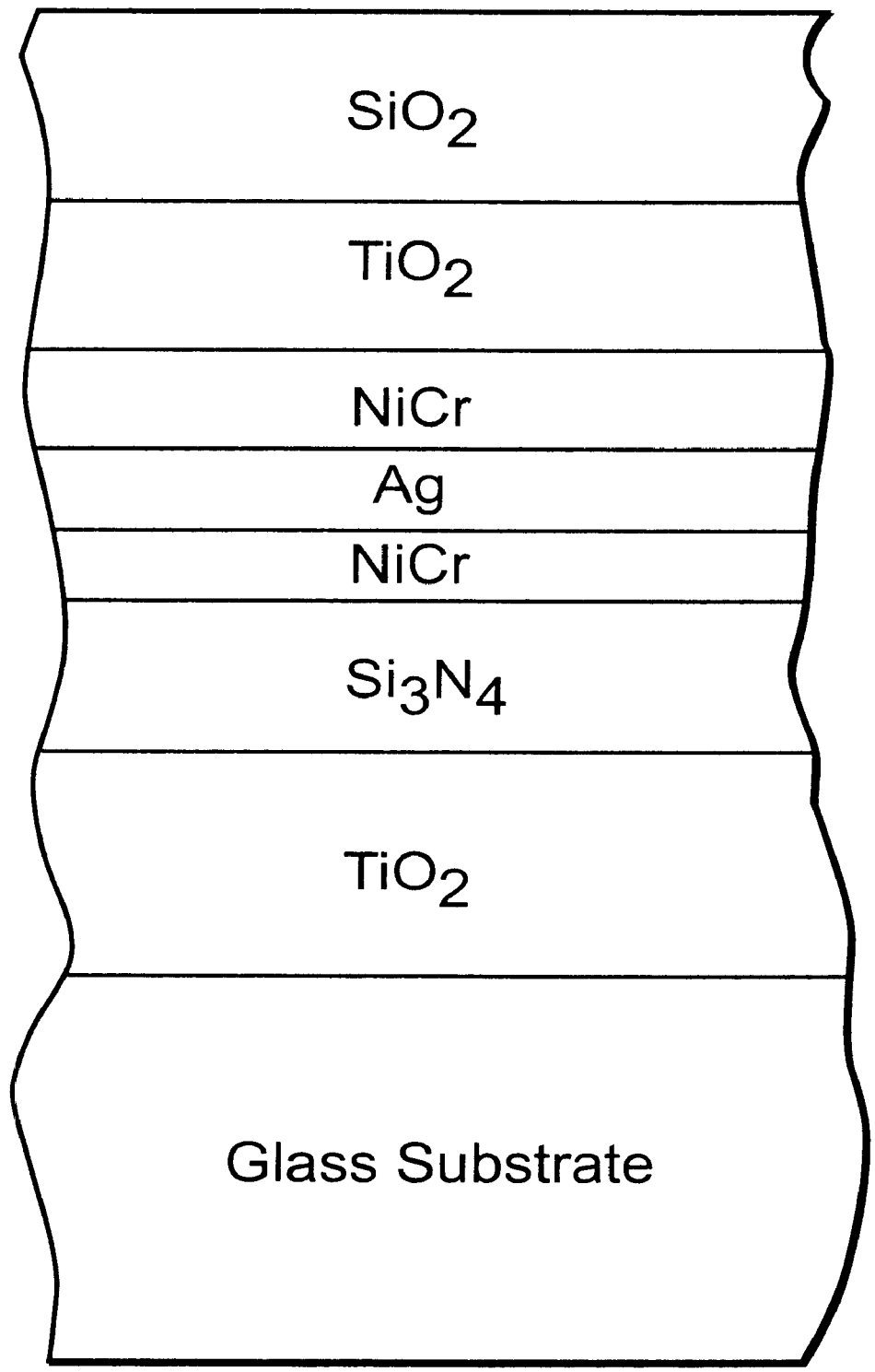
FIG. 9 is a cross sectional view of a coated article according to another embodiment of this invention.

FIG. 9 is a cross sectional view of a coated article according to another embodiment of this invention. The coated article of FIG. 9 includes a coating including, from the glass substrate outwardly (all indices at 550 nm):

glass (n=1.51)

titanium oxide (e.g., $TiO_2$) (n=2.1 to 2.7)

silicon nitride (e.g., $Si_3N_4$) (n=1.8 to 2.2, preferably n=2.0)

nickel-chromium (NiCr)

silver (Ag)

nickel-chromium (NiCr)

titanium oxide (e.g., $TiO_2$) (n=2.1 to 2.7)

silicon oxide (e.g., $SiO_2$) (n=1.4 to 1.7, preferably n=1.45)

air (n=1.0)

The FIG. 9 anti-reflection system includes the bottom titanium oxide and silicon nitride layers, and the dielectrics provided on top of the NiCr and Ag layers, namely the top titanium oxide layer and the silicon oxide layer. By gradually decreasing the respective indices of refraction "n" from the top NiCr layer (i.e., top contact layer) outwardly toward the air (i.e., the silicon oxide layer having a small index n than the top titanium oxide layer), the anti-reflection system enables reduced visible reflection and thus increased visible transmission to be achieved. The use of titanium oxide ($TiO_x$, x being from 1.5 to 2.5, e.g., x=2) is useful as its index of refraction n can be varied from 2.1 to 2.7 (more preferably from 2.4 to 2.65). Surprisingly, as will be shown below in the Example(s) of this embodiment, the anti-reflection system also enables color of the coated article (i.e., transmissive and/or glass side reflective) to move more toward neutral.

EXAMPLE(S) OF FIG. 9 EMBODIMENT

The Tables below illustrate Example(s) (Ex.) of the FIG. 9 embodiment, compared to a Comparative Example(s) (CE) similar to prior art FIG. 1 of the instant application. Example A (Ex. A) of the FIG. 9 embodiment should be compared to Comparative Example A (CE A), since they both have the same basic solar control layers (i.e., the Ag and NiCr thicknesses and arrangement are the same in both). Likewise, Example B (Ex. B) of the FIG. 9 embodiment should be compared to Comparative Example B (CE B), since they both have the same basic solar control layers (i.e., the Ag and NiCr thicknesses and arrangement are the same in both). For these simulation examples in the Tables below, the following indices of refraction were assumed: for glass, n=1.51; for $Si_3N_4$, n=2.0; for $SiO_xN_y$, n=1.72; for $SiO_2$, n=1.45; and for $TiO_2$, n=2.47, all at 550 nm.

FIRST TABLE: LAYER STRUCTURE (FIG. 9 embodiment)

|       | Glass  | $TiO_2$ | $Si_3N_4$ | NiCr | Ag   | NiCr | $TiO_2$ | $Si_3N_4$ | $SiO_xN_y$ | $SiO_2$ |
|-------|--------|---------|-----------|------|------|------|---------|-----------|------------|---------|
| Ex. A: | 3.7 mm | 202Å    | 157Å      | 9Å   | 80Å  | 9Å   | 244Å    | 0Å        | 0Å         | 476Å    |
| CE A:  | 3.7 mm | 233Å    | 85Å       | 9Å   | 80Å  | 9Å   | 0Å      | 509Å      | 0Å         | 0Å      |
| Ex. B: | 3.7 mm | 129Å    | 241Å      | 9Å   | 70Å  | 9Å   | 232Å    | 0Å        | 0Å         | 521Å    |
| CE B:  | 3.7 mm | 174Å    | 152Å      | 9Å   | 70Å  | 9Å   | 0Å      | 512Å      | 0Å         | 0Å      |

SECOND TABLE: OPTICAL PERFORMANCE (FIG. 9 embodiment)

|       | $T_{vis}$ | $a^*_t$ | $b^*_t$ | $R_{glass\ side\ (g)}$ | $a^*_g$ | $b^*_g$ | $R_{film\ side\ (f)}$ | $a^*_f$ | $b^*_f$ |
|-------|-----------|---------|---------|------------------------|---------|---------|------------------------|---------|---------|
| Ex. A: | 80.2%    | -2.2    | -1.5    | 6.0%                   | 0.0     | -1.6    | 3.8%                   | 2.9     | -2.0    |
| CE A:  | 78.4%    | -2.2    | -1.2    | 5.7%                   | -0.8    | -1.1    | 3.7%                   | 2.6     | -1.9    |
| Ex. B: | 79.6%    | -2.0    | -1.3    | 6.6%                   | -1.1    | -0.7    | 3.7%                   | 1.6     | -1.7    |
| CE B:  | 78.0%    | -2.1    | -1.0    | 6.4%                   | -1.4    | -1.3    | 3.8%                   | 2.0     | -1.8    |

It can be seen from the Tables above regarding the FIG. 9 embodiment of this invention, that the anti-reflection system of the instant invention enables better visible transmission characteristics (i.e., increased transmission %) than the Comparative Examples CE.

Figure 10:
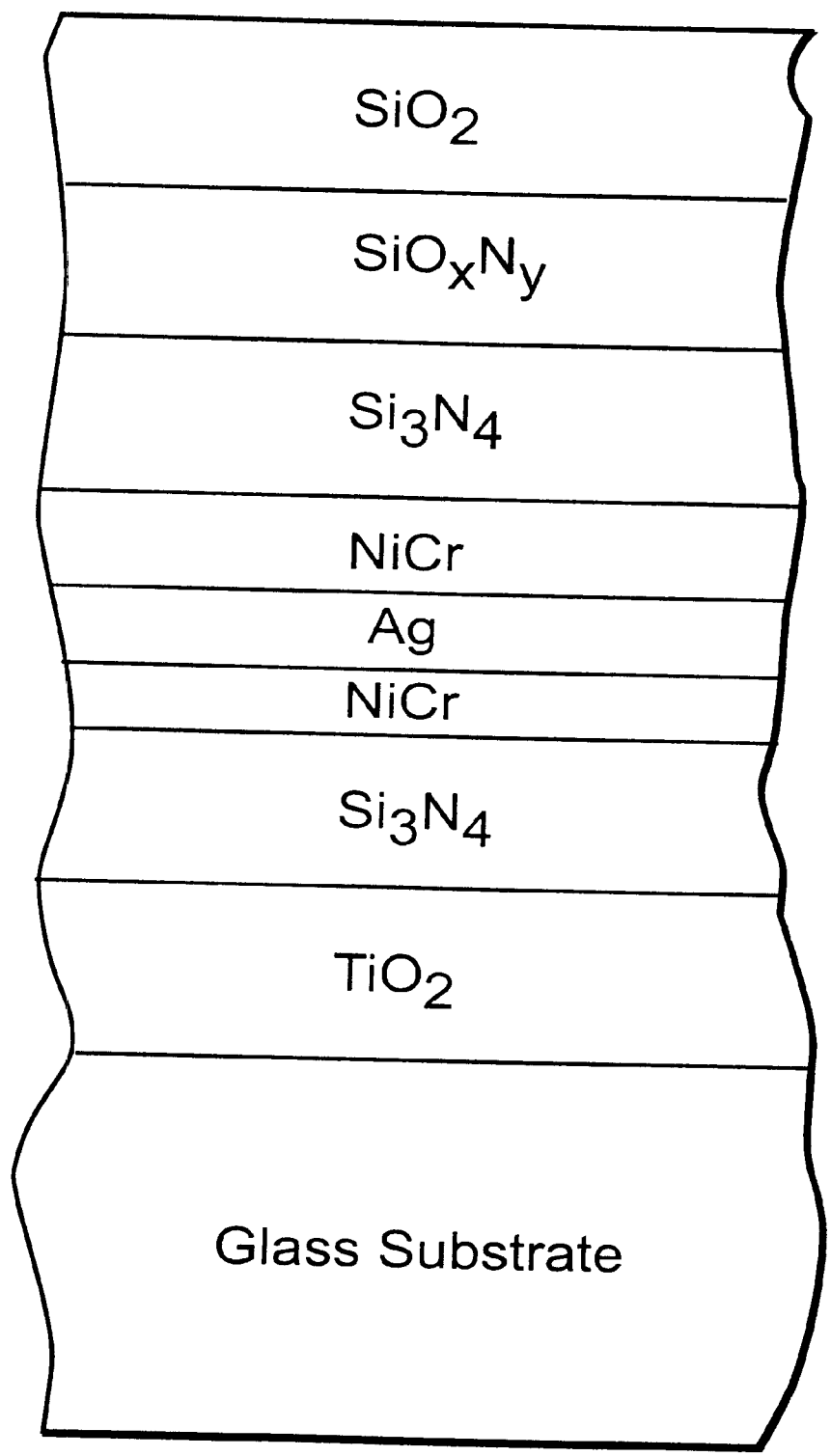
FIG. 10 is a cross sectional view of a coated article according to another embodiment of this invention.

FIG. 10 is a cross sectional view of a coated article according to another embodiment of this invention. The coated article of FIG. 10 includes a coating including, from the glass substrate outwardly (all indices at 550 nm):

glass (n=1.51)

titanium oxide (e.g., $TiO_2$) (n=2.1 to 2.7)

silicon nitride (e.g., $Si_3N_4$) (n=1.8 to 2.2, preferably n=2.0)

nickel-chromium (NiCr)

silver (Ag)

nickel-chromium (NiCr)

silicon nitride (e.g., $Si_3N_4$) (n=1.8 to 2.2, preferably n=2.0)

silicon oxynitride ($SiO_xN_y$)(n=1.45 to 2.0, preferably n=1.6–1.9)

silicon oxide (e.g., $SiO_2$) (n=1.4 to 1.7, preferably n=1.45)

air (n=1.0)

The FIG. 10 anti-reflective system includes the bottom titanium oxide and silicon nitride layers and the dielectrics provided on top of the NiCr and Ag layers, namely the top silicon nitride layer, the top silicon oxynitride layer and the silicon oxide layer. By gradually decreasing the respective indices of refraction "n" from the top NiCr layer (i.e., top contact layer) outwardly toward the air, the anti-reflection system enables reduced visible reflection and thus increased visible transmission to be achieved. Surprisingly, as will be shown below in the Example(s) of this embodiment, the anti-reflection system also enables color of the coated article (i.e., transmissive and/or glass side reflective) to move more toward neutral. A significant advantage associated with the FIG. 10 embodiment is that each of the upper dielectric layers comprises Si so that all three can be deposited using a single Si target or a group of Si target(s) thereby avoiding the need for other target types in the sputter coater; only the gas flow(s) need be varied between the three layers.

EXAMPLE(S) OF FIG. 10 EMBODIMENT

The Tables below illustrate Example(s) (Ex.) of the FIG. 10 embodiment, compared to a Comparative Example(s) (CE) similar to prior art FIG. 1 of the instant application. Example A (Ex. A) of the FIG. 10 embodiment should be compared to Comparative Example A (CE A), since they both have the same basic solar control layers (i.e., the Ag and NiCr thicknesses and arrangement are the same in both). Likewise, Examples B–D (Exs. B–D) of the FIG. 10 embodiment should be compared to Comparative Example B (CE B), since they all have the same basic solar control layers (i.e., the Ag and NiCr thicknesses and arrangement are the same in both). For these simulation examples in the Tables below, the following indices of refraction were assumed: for glass, n=1.51; for $Si_3N_4$, n=2.0; for $SiO_xN_y$, n=1.72; for $SiO_2$, n=1.45; and for $TiO_2$, n=2.47, all at 550 nm.

FIRST TABLE: LAYER STRUCTURE (FIG. 10 embodiment)

|       | Glass  | TiO$_2$ | Si$_3$N$_4$ | NiCr | Ag   | NiCr | TiO$_2$ | Si$_3$N$_4$ | SiO$_x$N$_y$ | SiO$_2$ |
|-------|--------|---------|-------------|------|------|------|---------|-------------|--------------|---------|
| Ex. A: | 3.7 mm | 120Å | 102Å | 9Å | 120Å | 9Å | 0Å | 298Å | 184Å | 79Å |
| CE A:  | 3.7 mm | 0Å   | 332Å | 9Å | 120Å | 9Å | 0Å | 570  | 0Å   | 0Å  |
| Ex. B: | 3.7 mm | 60Å  | 236Å | 9Å | 90Å  | 9Å | 0Å | 237Å | 90Å  | 346Å |
| Ex. C: | 3.7 mm | 180Å | 119Å | 9Å | 90Å  | 9Å | 0Å | 257Å | 250Å | 74Å |
| Ex. D: | 3.7 mm | 240Å | 61Å  | 9Å | 90Å  | 9Å | 0Å | 353Å | 168Å | 42Å |
| CE B:  | 3.7 mm | 0Å   | 433Å | 9Å | 90Å  | 9Å | 0Å | 426Å | 0Å   | 0Å  |
| Ex. E: | 3.7 mm | 120Å | 196Å | 9Å | 70Å  | 9Å | 0Å | 196Å | 317Å | 110Å |
| CE E:  | 3.7 mm | 174Å | 152Å | 9Å | 70Å  | 9Å | 0Å | 512  | 0Å   | 0Å  |

SECOND TABLE: OPTICAL PERFORMANCE (FIG. 10 embodiment)

|       | T$_{vis}$ | a*$_t$ | b*$_t$ | R$_{glass\ side\ (g)}$ | a*$_g$ | b*$_g$ | R$_{film\ side\ (f)}$ | a*$_f$ | b*$_f$ |
|-------|-----------|--------|--------|------------------------|--------|--------|-----------------------|--------|--------|
| Ex. A: | 73.3% | -2.7 | -1.6 | 9.1%  |  1.3 | -1.9 | 4.0% | 9.6 | -4.0  |
| CE A:  | 67.3% | -2.2 |  4.0 | 16.9% | -2.5 | -7.5 | 8.8% | 2.3 | -20.8 |
| Ex. B: | 75.9% | -2.2 | -1.3 | 6.5%  |  0.0 | -2.2 | 3.2% | 5.6 | -2.4  |
| Ex. C: | 78.1% | -2.1 | -1.7 | 5.1%  | -0.7 | -1.6 | 3.2% | 3.5 | -2.0  |
| Ex. D: | 78.5% | -2.1 | -1.7 | 5.2%  | -1.4 | -0.6 | 3.4% | 2.1 | -1.7  |
| CE B:  | 75.1% | -2.5 | -0.6 | 5.3%  |  2.4 | -8.5 | 3.3% | 7.5 | -0.7  |
| Ex. E: | 78.5% | -1.9 | -1.4 | 5.6%  | -1.9 | -0.9 | 3.2% | 1.8 | -1.6  |
| CE E:  | 78.0% | -2.1 | -1.0 | 6.4%  | -1.4 | -1.3 | 3.8% | 2.0 | -1.8  |

It can be seen from the Tables above regarding the FIG. 10 embodiment of this invention, that the anti-reflection system of the instant invention enables better transmission characteristics (i.e., increased transmission %) and/or better reflection characteristics (i.e., reduced glass side reflection (R$_g$)). This embodiment also enables more neutral color in some instances. For example, Examples A–E of the FIG. 10 embodiment exhibit better (higher) transmission than their comparative example (CE) counterparts. Certain examples (e.g., Exs. A and E) also exhibit better reflection (i.e., low glass side reflection) characteristics than their CE counterparts. More neutral color was also achieved in Exs. B–D. Surprisingly, it can be seen from Exs. B–D that transmission gets better (higher) as the thickness of the underlying titanium oxide layer increases; thus in certain example embodiments of this invention it is desirable for the bottom titanium oxide layer (below the Ag) to have a thickness of at least 120 Å, more preferably from about 120–250 Å for rather thick Ag layers.(i.e., the optimum titanium oxide index of refraction depends upon the Ag layer thickness).

Figure 11:
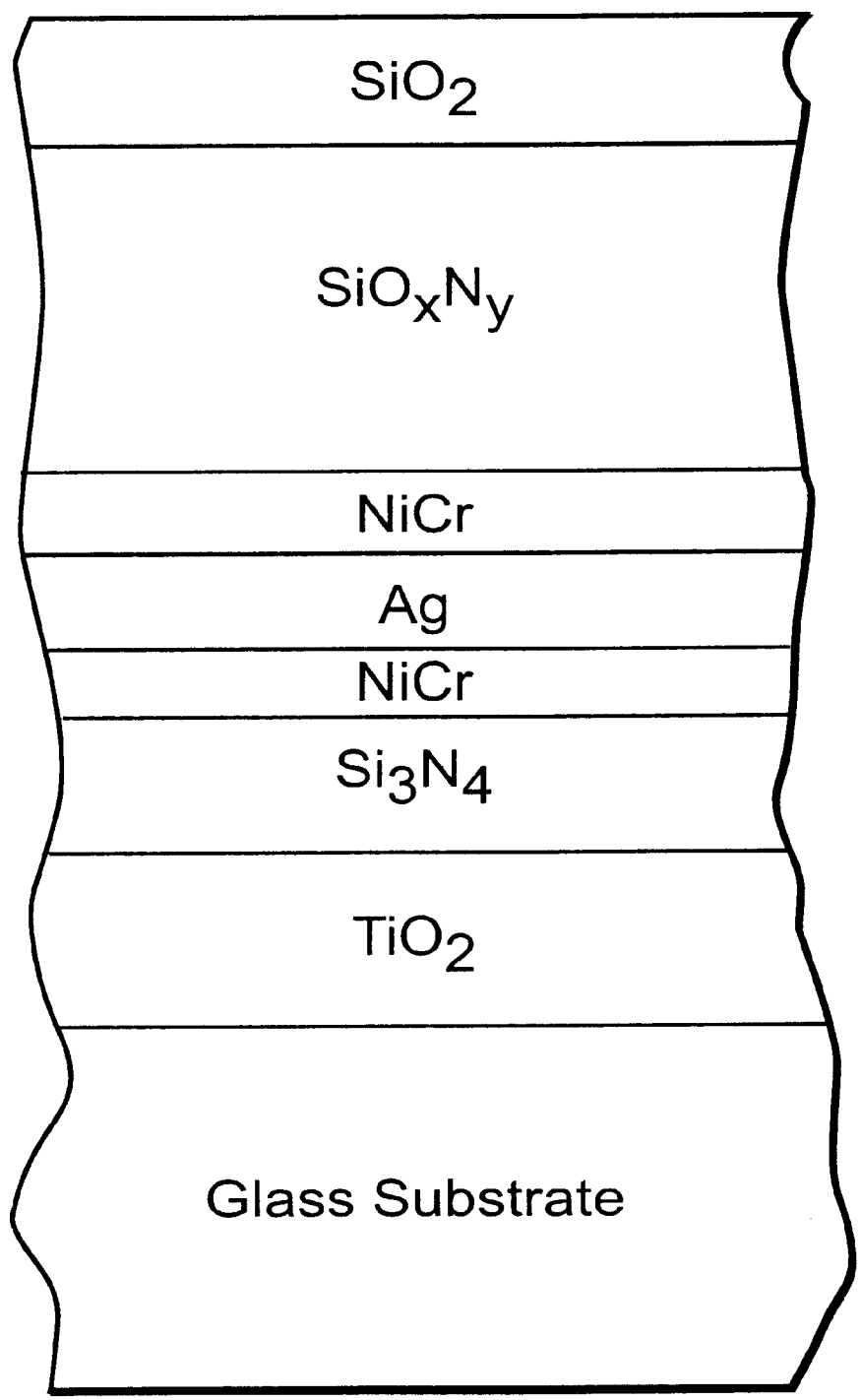
FIG. 11 is a cross sectional view of a coated article according to another embodiment of this invention.

FIG. 11 is a cross sectional view of a coated article according to another embodiment of this invention. The coated article of FIG. 11 includes a coating including, from the glass substrate outwardly (all indices n at 550 nm):

glass (n=1.51)
titanium oxide (e.g., TiO$_2$) (n=2.1 to 2.7)
silicon nitride (e.g., Si$_3$N$_4$) (n=1.8 to 2.2, preferably n=2.0)
nickel-chromium (NiCr)
silver (Ag)
nickel-chromium (NiCr)
silicon oxynitride (SiO$_x$N$_y$) (n=1.45 to 2.0, preferably n=1.6–1.9)
silicon oxide (e.g., SiO$_2$) (n=1.4 to 1.7, preferably n=1.45)
air (n=1.0)

The FIG. 11 anti-reflection system includes the bottom titanium oxide and silicon nitride layers and the dielectrics provided on top of the NiCr and Ag layers, namely the top silicon oxynitride and oxide layers. By progressively (gradually) decreasing the respective indices of refraction "n" from the top NiCr layer (i.e., top contact layer) outwardly toward the air, the anti-reflection system enables reduced visible reflection and thus increased visible transmission to be achieved. The use of silicon oxynitride is useful in that its index of refraction n can be varied as discussed above depending upon, for example, the amount of oxygen and/or nitrogen gas used during its sputtering. A significant advantage associated with the FIG. 11 embodiment is that each of the upper dielectric layers comprises Si so that both upper dielectric layers can be deposited using a single Si target or a group of Si target(s) thereby avoiding the need for other target types in the sputter coater; only the gas flow(s) need be varied between the two layers.

EXAMPLE(S) OF FIG. 11 EMBODIMENT

The Tables below illustrate Example(s) (Ex.) of the FIG. 11 embodiment, compared to a Comparative Example(s) (CE) similar to prior art FIG. 1 of the instant application. Example A (Ex. A) of the FIG. 11 embodiment should be compared to Comparative Example A (CE A), since they both have the same basic solar control layers (i.e., the Ag and NiCr thicknesses and arrangement are the same in both). For these simulation examples in the Tables below, the following indices of refraction were assumed: for glass, n=1.51; for Si$_3$N$_4$, n=2.0; for SiO$_x$N$_y$, n=1.72; for SiO$_2$, n=1.45; and for TiO$_2$, n=2.47, all at 550 nm.

FIRST TABLE: LAYER STRUCTURE (FIG. 11 embodiment)

|  | Glass | TiO$_2$ | Si$_3$N$_4$ | NiCr | Ag | NiCr | TiO$_2$ | Si$_3$N$_4$ | SiO$_x$N$_y$ | SiO$_2$ |
|---|---|---|---|---|---|---|---|---|---|---|
| Ex. A: | 3.7 mm | 27Å | 45Å | 9Å | 70Å | 9Å | 0Å | 0Å | 566Å | 16Å |
| CE A: | 3.7 mm | 174Å | 152Å | 9Å | 70Å | 9Å | 0Å | 512Å | 0Å | 0Å |

SECOND TABLE: OPTICAL PERFORMANCE (FIG. 11 embodiment)

|  | T$_{vis}$ | a*$_t$ | b*$_t$ | R$_{glass\ side\ (g)}$ | a*$_g$ | b*$_g$ | R$_{film\ side\ (f)}$ | a*$_f$ | b*$_f$ |
|---|---|---|---|---|---|---|---|---|---|
| Ex. A: | 79.3% | −2.2 | −1.6 | 4.7% | 0.3 | −0.9 | 5.1% | 2.7 | −2.2 |
| CE A: | 78.0% | −2.1 | −1.0 | 6.4% | −1.4 | −1.3 | 3.8% | 2.0 | −1.8 |

It can be seen from the Tables above regarding the FIG. 11 embodiment of this invention, that the anti-reflection system of the instant invention enables better transmission characteristics (i.e., increased transmission %) and better reflection characteristics (i.e., reduced glass side reflection (R$_g$)). Neutral color is also realized. In particular, Ex. A had better visible transmission (higher T$_{vis}$) than CE A; Ex. A had better glass side reflection (lower R$_g$) than CE A.

Figure 12:
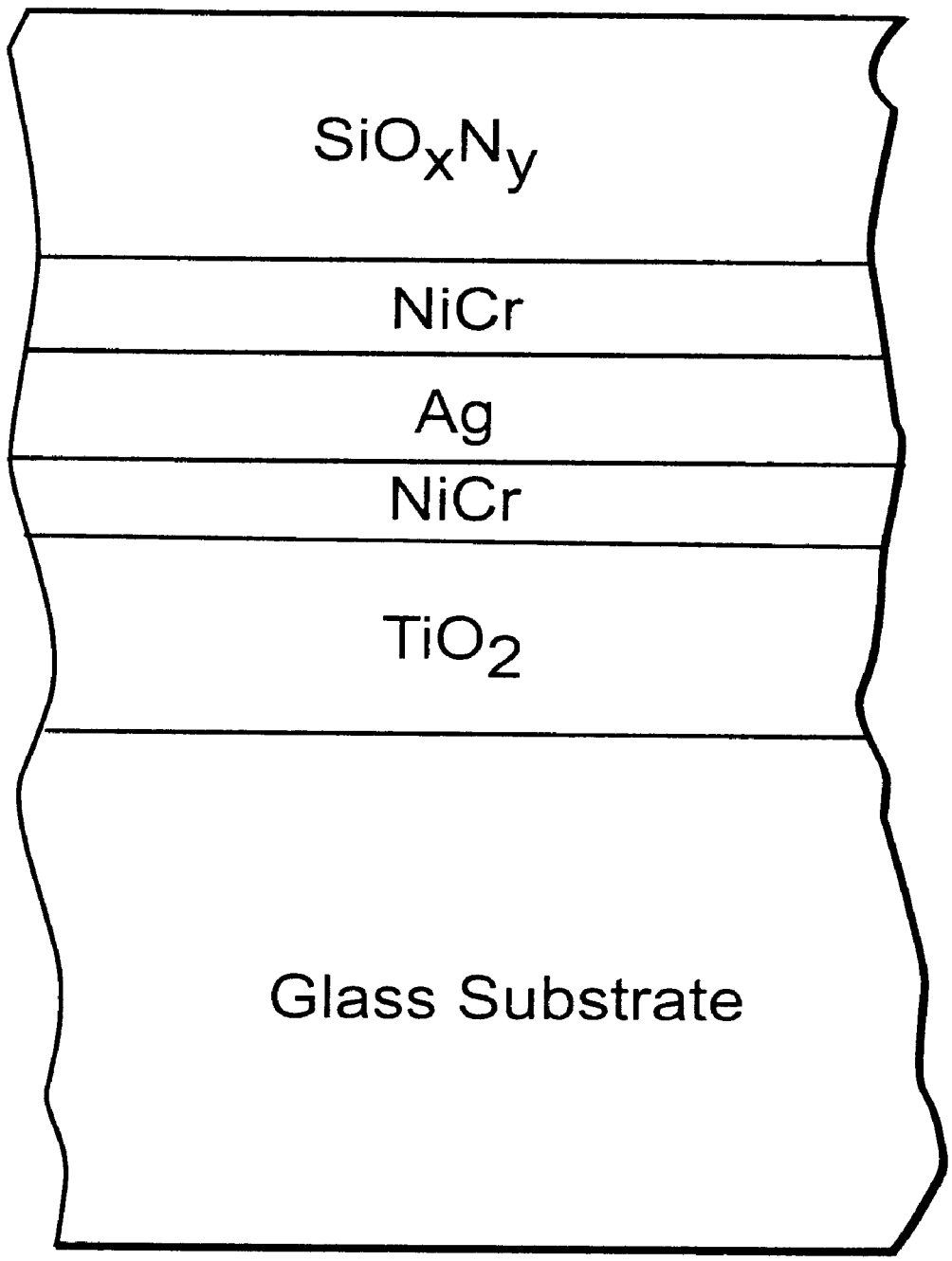
FIG. 12 is a cross sectional view of a coated article according to another embodiment of this invention.

FIG. 12 is a cross sectional view of a coated article according to another embodiment of this invention. The coated article of FIG. 12 includes a coating including, from the glass substrate outwardly (all in dices at 550 nm):

glass (n=1.51)
titanium oxide (e.g., TiO$_2$) (n=2.1 to 2.7)
nickel-chromium (NiCr)
silver (Ag)
nickel-chromium (NiCr)
silicon oxynitride (SiO$_x$N$_y$) (n=1.45 to 2.0, preferably n=1.6–1.9)
air (n=1.0)

The FIG. 12 anti-reflection system includes the bottom titanium oxide layer and the dielectric silicon oxynitride provided on top of the NiCr and Ag layers. Surprisingly, the use of silicon oxynitride on the top of the metal layers results in increased visible transmission and reduced glass side reflection as compared to using silicon nitride on top of the metal layers. Neutral color is also achievable in certain example embodiments.

EXAMPLE(S) OF FIG. 12 EMBODIMENT

The Tables below illustrate Example(s) (Ex.) of the FIG. 12 embodiment, compared to a Comparative Example(s) (CE) similar to prior art FIG. 1 of the instant application. Example A (Ex. A) of the FIG. 12 embodiment should be compared to Comparative Example A (CE A), since they both have the same basic solar control layers (i.e., the Ag and NiCr thicknesses and arrangement are the same in both). For these simulation examples in the Tables below, the following indices of refraction were assumed: for glass, n=1.51; for Si$_3$N$_4$, n=2.0; for SiO$_x$N$_y$, n=1.72; for SiO$_2$, n=1.45; and for TiO$_2$, n=2.47, all at 550 nm.

FIRST TABLE: LAYER STRUCTURE (FIG. 12 embodiment)

|  | Glass | TiO$_2$ | Si$_3$N$_4$ | NiCr | Ag | NiCr | TiO$_2$ | Si$_3$N$_4$ | SiO$_x$N$_y$ | SiO$_2$ |
|---|---|---|---|---|---|---|---|---|---|---|
| Ex. A: | 3.7 mm | 291Å | 0Å | 9Å | 80Å | 9Å | 0Å | 0Å | 568Å | 0Å |
| CE A: | 3.7 mm | 233Å | 85Å | 9Å | 80Å | 9Å | 0Å | 509Å | 0Å | 0Å |

SECOND TABLE: OPTICAL PERFORMANCE (FIG. 12 embodiment)

|  | T$_{vis}$ | a*$_t$ | b*$_t$ | R$_{glass\ side\ (g)}$ | a*$_g$ | b*$_g$ | R$_{film\ side\ (f)}$ | a*$_f$ | b*$_f$ |
|---|---|---|---|---|---|---|---|---|---|
| Ex. A: | 79.0% | −2.0 | −1.8 | 4.6% | −1.0 | 0.1 | 4.5% | 2.1 | −2.2 |
| CE A: | 78.4% | −2.2 | −1.2 | 5.7% | −0.8 | −1.1 | 3.7% | 2.6 | −1.9 |

Figure 1:
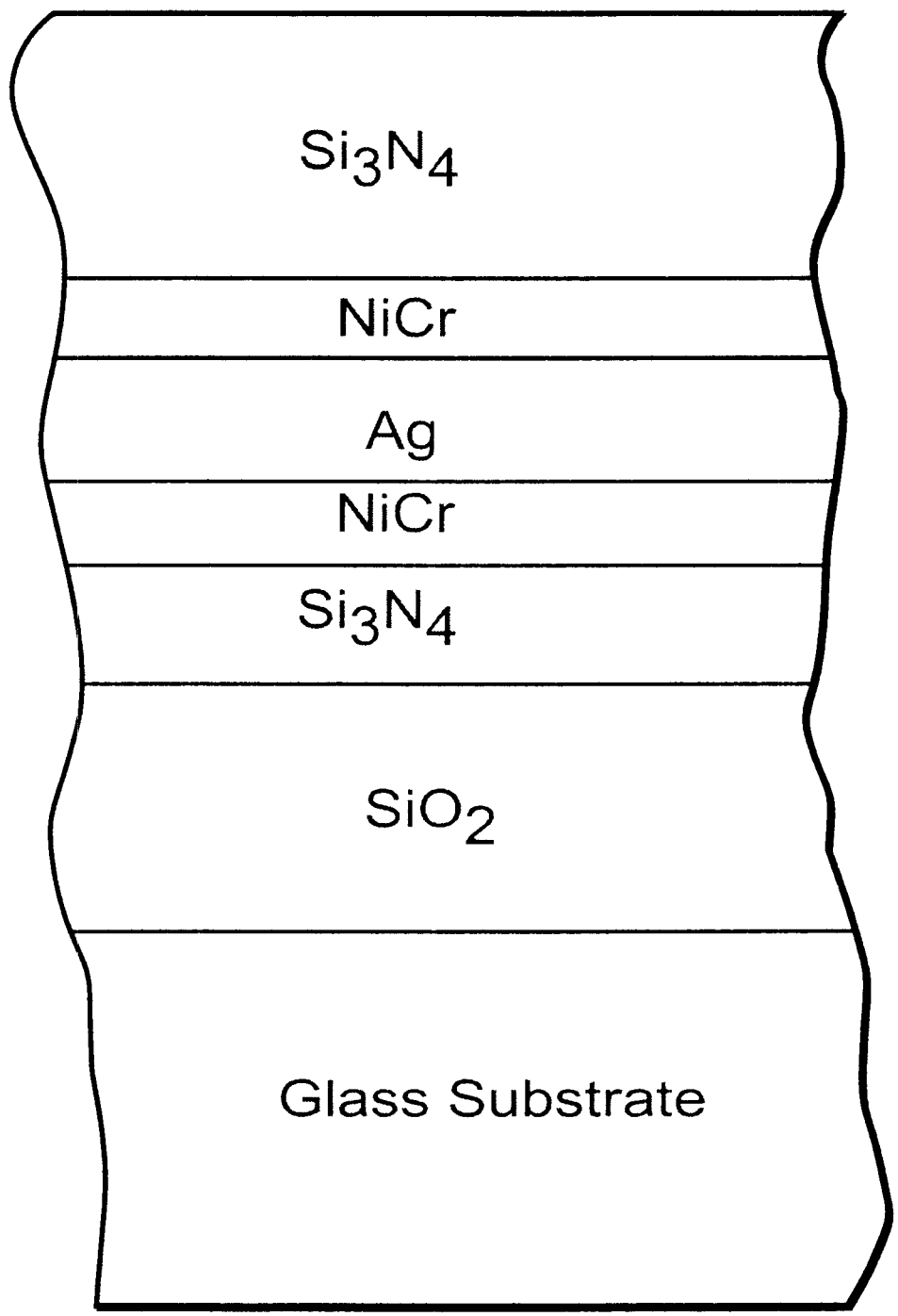
FIG. 1 is a cross sectional view of a prior art coated article.

It can be seen from the Tables above regarding the FIG. 12 embodiment of this invention, that the anti-reflection system of the instant invention enables better transmission characteristics (i.e., increased transmission %) and better reflection characteristics (i.e., reduced glass side reflection (R$_g$)) than the CE which is similar to prior art FIG. 1. Neutral color is also realized. In particular, Ex. A had better visible transmission (higher T$_{vis}$) than CE A, and better glass side reflection (lower R$_g$) than CE A.

In the FIG. 12 embodiment, as well as all other embodiments herein, the silicon oxynitride layer may have a constant index of refraction n through its entire (or most of its) thickness (e.g., n=1.72). However, it also may be oxidation and/or nitrogen graded throughout its thickness so that its refractive index "n" progressively or gradually changes (e.g., decreases) throughout its thickness from one side to the other (i.e., it is index graded). For example, by adjusting the oxygen and/or nitrogen gas used in depositing the silicon oxynitride layer during its sputtering, its index of refraction n may change from about 1.8 (or even 2.0) at the portion of the silicon oxynitride layer closest to the Ag layer to a lesser value of about 1.6 (or even 1.5) at the portion of the layer closer to air. By grading the silicon oxynitride layer in such a manner, the index of refraction can progressively decrease moving toward air in order to increase visible transmission and/or reduce reflection of the overall coated article.

With respect to neutrality of color, in certain example embodiments of this invention coated articles (monolithic and/or IG units) have: (a) transmissive a* values from −4.0 to +3.0, more preferably from −4.0 to +2.0, even more preferably from −2.5 to +1.0; and most preferably from −2.5 to +0.5; (b) transmissive b* values from −5.0 to +4.0, more preferably −3.0 to +2.0, even more preferably from −2.0 to +2.5, and most preferably from −1.0 to +2.0; (c) glass side reflective a* values from −5.0 to +3.0, more preferably from −3.5 to +3.5, even more preferably from −3.0 to +1.0, and most preferably from −2.5 to +0.5; and/or (d) glass side reflective b* values from −6.0 to +4.0, more preferably −4.0 to +2.5, even more preferably from −3.5 to +2.0, and most preferably from −2.5 to +1.0. As for visible transmission ($T_{vis}$), coated articles according to certain example embodiments of this invention have a visible transmission ($T_{vis}$) (Ill. C, 2 degree observer) of at least 70%, more preferably of at least 74%, and most preferably of at least 77% (e.g., for a glass thickness of from 1–4mm). Coated articles according to certain example embodiments of this invention have a glass side reflectance ($R_g$)<=15%, more preferably <=10%, even more preferably <=8%, and most preferably <=6% (it is noted that glass side reflectance in this regard is a function of thickness of the Ag layer; the thicker the Ag layer the higher the glass side reflectance but also the better the thermal properties of the coated article—so there are tradeoffs in different embodiments of this invention). The aforesaid characteristics apply to heat treated and/or non-heat treated coated articles according to this invention.

As for color, it is noted that when put in an IG unit, the color of a monolithic coated article tends to shift in the green direction. This is why small positive a* values can be tolerated and often desired in monolithic coated articles intended to be used in IG units.

While the illustrated embodiments discussed above each include only a single IR reflecting layer (e.g., Ag), it is noted that in alternative embodiments of this invention additional IR reflecting layer(s) (e.g., Ag) may be provided. Thus, AR systems herein may be applied over a single Ag layer stack as illustrated in FIGS. 2–12, or alternatively may be provided over double or even triple Ag layer stacks as will be recognized by those skilled in the art. Moreover, additional layer(s) may be added to coated articles according to this invention, either between the illustrated coatings and the substrate, over the illustrated coatings and the substrate, and/or between layers of the illustrated coatings. Thus, referring to FIG. 2 for purposes of example, while the silicon oxynitride layer is located between the silicon oxide and titanium oxide layers, other additional layer(s) may in some instances also be provided between the silicon oxide and titanium oxide layers (i.e., the term "between" as used herein does not mean that a first layer located "between" two other layers has to contact those other layers).

Thicknesses of the contact (e.g., NiCr) layers and the IR reflecting layer(s) (e.g,. Ag) are discussed above. With respect to other layer thicknesses, bottom titanium oxide layers according to example embodiments of this invention may be from 10–600 Å thick, more preferably from 50–300 Å thick, and most preferably from 50–250 Å thick. Bottom silicon nitride layers herein (i.e., between the Ag layer and the substrate) in certain example embodiments of this invention may be from about 10–600 Å thick, more preferably from 25–450 Å thick, and most preferably from 50–350 Å thick. Top titanium oxide layers (i.e., above the Ag) in certain example embodiments of this invention may be from 10–500 Å thick, more preferably from 50–300 Å thick. Top silicon nitride layers in certain example embodiments of this invention may be from 10–600 Å thick, more preferably from 50–500 Å thick, and most preferably from 50–400 Å thick. Silicon oxynitride layers according to certain example embodiments of this invention may be from 20–800 Å thick, more preferably from 40–600 Å thick. Silicon oxide layers according to example embodiments of this invention may be from about 10–700 Å thick, more preferably from 20–600 Å thick, and most preferably from 50–500 Å thick. Moreover, while these materials are used in certain examples of this invention, they are not to be limiting unless specifically claimed as other layer material(s) may instead be used in the general nature of the instant invention.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A coated article including a coating supported by a glass substrate, the coating comprising:
   a metallic infrared (IR) reflecting layer sandwiched between first and second contact layers;
   a first dielectric layer having an index of refraction n<=2.7 provided between the IR reflecting layer and the glass substrate;
   a second dielectric layer comprising titanium oxide provided over the IR reflecting layer;
   a third dielectric layer comprising silicon oxynitride provided over the IR reflecting layer;
   a fourth dielectric layer comprising silicon oxide provided over the IR reflecting layer; and
   wherein the third dielectric layer comprising silicon oxynitride is provided between the second and fourth dielectric layers.

2. The coated article of claim 1, wherein the third dielectric layer comprising silicon oxynitride contacts at least one of the second and fourth dielectric layers.

3. The coated article of claim 1, wherein the coated article has a visible transmission of at least 70%, a sheet resistance ($R_s$) of no greater than 20 ohms/square, and a glass side reflectance <=15%.

4. The coated article of claim 1, wherein the coated article has a visible transmission of at least 74%.

5. The coated article of claim 1, wherein the first dielectric layer comprises titanium oxide.

6. The coated article of claim 1, wherein the titanium oxide comprises $TiO_2$.

7. The coated article of claim 1, further comprising a layer(s) comprising silicon nitride provided between at least one of: (a) the first dielectric layer and the IR reflecting layer, and (b) the third dielectric layer and the IR reflecting layer.

8. The coated article of claim 1, wherein the IR reflecting layer comprises Ag, and wherein at least one of the first and second contact layers comprises NiCr.

9. The coated article of claim 1, wherein the IR reflecting layer comprises Ag, and wherein each of the first and second contact layers comprises an oxide of NiCr.

10. The coated article of claim 1, wherein the IR reflecting layer comprises Ag, and wherein at least one of the first and second contact layers comprises a nitride of NiCr.

11. The coated article of claim 1, wherein the coated article has color characterized by: a transmissive a* value from −4.0 to +2.0, a transmissive b* value from −5.0 to +4.0, a glass side reflective a* value from −3.5 to +3.5, and a glass side reflective b* value from −6.0 to +4.0.

12. The coated article of claim 11, wherein the coated article has color characterized by at least one of a transmissive a* value from −2.5 to +1.0, and a glass side reflective a* value from −3.0 to +1.0.

13. The coated article of claim 1, wherein the third dielectric layer comprising silicon oxynitride is tuned so as to have an index of refraction n from 1.6 to 1.9.

14. The coated article of claim 1, wherein the third dielectric layer comprising silicon oxynitride is at least one of oxidation graded and nitrogen graded, so that an index of refraction n of the third dielectric layer comprising silicon oxynitride changes from a first value in a first portion of the third dielectric layer to a lower second value in a second portion of the third dielectric layer, wherein the second portion of the third dielectric layer comprising silicon oxynitride with the smaller index of refraction n is further from the IR reflecting layer than is the first portion of the third dielectric layer.

15. The coated article of claim 1, wherein the second dielectric layer comprising titanium oxide is index graded so that an index of refraction n of the second dielectric layer comprising titanium oxide changes from a first value in a first portion of the second dielectric layer to a smaller second value in a second portion of the second dielectric layer, wherein the second portion of the second dielectric layer comprising titanium oxide with the smaller index of refraction n is further from the IR reflecting layer than is the first portion of the second dielectric layer.

16. The coated article of claim 1, further comprising a dielectric layer comprises silicon nitride provided between the second dielectric layer comprising titanium oxide and the third dielectric layer comprising silicon oxynitride.

17. The coated article of claim 16, wherein the silicon nitride comprises $Si_3N_4$.

18. A coated article including a coating supported by a glass substrate, the coating comprising:
- a metallic infrared (IR) reflecting layer sandwiched between first and second contact layers which contact the IR reflecting layer;
- a first dielectric layer having an index of refraction n<=3.0 provided between the IR reflecting layer and the glass substrate;
- a second dielectric layer comprising titanium oxide provided over the IR reflecting layer;
- a third dielectric layer comprising silicon oxide provided over the IR reflecting layer;
- wherein the second dielectric layer comprising titanium oxide is provided between the IR reflecting layer and the third dielectric layer comprising silicon oxide; and
- wherein the second dielectric layer comprising titanium oxide is index graded so that an index of refraction n of the second dielectric layer comprising titanium oxide changes from a first value in a first portion of the second dielectric layer to a smaller second value in a second portion of the second dielectric layer, wherein the second portion of the second dielectric layer comprising titanium oxide with the smaller index of refraction n is further from the IR reflecting layer than is the first portion of the second dielectric layer.

19. A coated article including a coating supported by a glass substrate, the coating comprising:
- a metallic infrared (IR) reflecting layer comprising silver sandwiched between first and second contact layers which contact the IR reflecting layer;
- a first dielectric layer having an index of refraction n<=3.0 provided between the IR reflecting layer and the glass substrate;
- a second dielectric layer comprising titanium oxide provided over the IR reflecting layer;
- a third dielectric layer comprising silicon oxynitride provided over the IR reflecting layer;
- wherein the second dielectric layer comprising titanium oxide is provided between the IR reflecting layer and the third dielectric layer comprising silicon oxynitride; and
- wherein the second dielectric layer comprising titanium oxide is index graded so that an index of refraction n of the second dielectric layer comprising titanium oxide changes from a first value in a first portion of the second dielectric layer to a smaller second value in a second portion of the second dielectric layer, wherein the second portion of the second dielectric layer comprising titanium oxide with the smaller index of refraction n is further from the IR reflecting layer than is the first portion of the second dielectric layer.

20. The coated article of claim 19, wherein the second and third dielectric layers contact one another.

21. The coated article of claim 19, wherein the coated article has a visible transmission of at least 70%, a sheet resistance ($R_s$) of no greater than 20 ohms/square, and a glass side reflectance <=15%.

22. The coated article of claim 19, wherein the titanium oxide comprises $TiO_2$ and the first dielectric layer comprises at least one of silicon oxynitride, silicon nitride and titanium oxide.

23. The coated article of claim 19, wherein each of the first and second contact layers comprises at least one of NiCr, an oxide of NiCr and a nitride of NiCr.

24. The coated article of claim 19, wherein the coated article has color characterized by: a transmissive a* value from −4.0 to +2.0, a transmissive b* value from −3.0 to +2.0.

25. The coated article of claim 24, wherein the coated article has color characterized by at least one of a transmissive a* value from −2.5 to +1.0, and a glass side reflective a* value from −3.0 to +1.0.

26. A coated article including a coating supported by a glass substrate, the coating comprising:
- a metallic infrared (IR) reflecting layer comprising silver sandwiched between first and second contact layers which contact the IR reflecting layer;
- a first dielectric layer having an index of refraction n<=3.0 provided between the IR reflecting layer and the glass substrate;
- a second dielectric layer comprising titanium oxide provided over the IR reflecting layer;
- a third dielectric layer comprising silicon oxynitride provided over the IR reflecting layer;

wherein the second dielectric layer comprising titanium oxide is provided between the IR reflecting layer and the third dielectric layer comprising silicon oxynitride; and a fourth dielectric layer comprising silicon oxide provided over each of the first, second and third dielectric layers.

27. The coated article of claim 26, wherein the fourth dielectric layer comprising silicon oxide is in contact with the third dielectric layer comprising silicon oxynitride.

28. The coated article of claim 26, further comprising a fifth dielectric layer comprising silicon nitride located between the first dielectric layer and the first contact layer.

29. The coated article of claim 19, wherein the third dielectric layer comprising silicon oxynitride is at least one of oxidation graded and nitrogen graded, so that an index of refraction n of the third dielectric layer comprising silicon oxynitride changes from a first value in a first portion of the third dielectric layer to a smaller second value in a second portion of the third dielectric layer, wherein the second portion of the third dielectric layer comprising silicon oxynitride with the smaller index of refraction n is further from the IR reflecting layer than is the first portion of the third dielectric layer.

30. A coated article including a coating supported by a glass substrate, the coating comprising:

a metallic infrared (IR) reflecting layer comprising silver sandwiched between first and second contact layers each of which contacts the IR reflecting layer;

a first dielectric layer having an index of refraction n<=3.0 provided between the IR reflecting layer and the glass substrate;

a second dielectric layer comprising silicon oxynitride provided over the IR reflecting layer;

a third dielectric layer comprising silicon oxide provided over the IR reflecting layer; and wherein the second dielectric layer comprising silicon oxynitride is provided between the IR reflecting layer and the third dielectric layer comprising silicon oxide.

31. The coated article of claim 30, wherein the second and third dielectric layers contact one another, and wherein the first dielectric layer comprises one of titanium oxide and silicon nitride.

32. The coated article of claim 30, wherein the coated article has a visible transmission of at least 70%, a sheet resistance ($R_s$) of no greater than 20 ohms/square, and a glass side reflectance <=15%.

33. The coated article of claim 30, wherein the coated article has a visible transmission of at least 74%.

34. The coated article of claim 30, wherein the first dielectric layer comprises titanium oxide and the silicon oxide comprises $SiO_2$.

35. The coated article of claim 30, wherein each of the first and second contact layers comprises Ni and Cr.

36. The coated article of claim 30, wherein the coated article has color characterized by: a transmissive a* value from −4.0 to +3.0, a transmissive b* value from −5.0 to +4.0, a glass side reflective a* value from −5.0 to +3.0, and a glass side reflective b* value from −6.0 to +4.0.

37. The coated article of claim 30, wherein the coated article has color characterized by at least one of a transmissive a* value from −2.5 to +1.0, and a glass side reflective a* value from −3.0 to +1.0.

38. The coated article of claim 30, wherein the second dielectric layer comprising silicon oxynitride is at least one of oxidation graded and nitrogen graded, so that an index of refraction n of the second dielectric layer comprising silicon oxynitride changes from a first value in a first portion of the second dielectric layer to a smaller second value in a second portion of the second dielectric layer, wherein the second portion of the second dielectric layer comprising silicon oxynitride with the smaller index of refraction n is further from the IR reflecting layer than is the first portion of the second dielectric layer.

39. The coated article of claim 30, further comprising a fourth dielectric layer comprising silicon nitride provided between the IR reflecting layer and the substrate.

40. The coated article of claim 30, further comprising a fourth dielectric layer comprising silicon nitride provided between the IR reflecting layer and the second dielectric layer comprising silicon oxynitride.

41. The coated article of claim 40, further comprising a fifth dielectric layer comprising silicon nitride provided between the IR reflecting layer and the substrate.

42. The coated article of claim 40, wherein the first dielectric layer comprises titanium oxide.

43. A coated article including a coating supported by a glass substrate, the coating comprising:

an infrared (IR) reflecting layer comprising silver sandwiched between first and second contact layers each of which contacts the IR reflecting layer;

a first dielectric layer having an index of refraction n<=3.0 provided between the IR reflecting layer and the glass substrate;

a second dielectric layer comprising titanium oxide provided over the IR reflecting layer;

wherein the coated article has a sheet resistance ($R_s$)<=20 ohms/square; and wherein the second dielectric layer comprising titanium oxide has a varying index of refraction so that an index of refraction n of the second dielectric layer comprising titanium oxide changes from a first value in a first portion of the second dielectric layer to a smaller second value in a second portion of the second dielectric layer, wherein the second portion of the second dielectric layer comprising titanium oxide with the smaller index of refraction n is further from the IR reflecting layer than is the first portion of the second dielectric layer.

44. The coated article of claim 43, further comprising another dielectric layer comprising silicon oxynitride deposited over the second dielectric layer comprising titanium oxide in a manner so as to have an index of refraction of from 1.6 to 1.9.

45. The coated article of claim 44, wherein the another dielectric layer comprising silicon oxynitride is at least one of oxidation graded and nitrogen graded, so that an index of refraction n of the dielectric layer comprising silicon oxynitride changes from a first value in a first portion of the layer to a smaller second value in a second portion of the layer, wherein the second portion of the layer comprising silicon oxynitride with the smaller index of refraction n is further from the IR reflecting layer than is the first portion of the layer.

46. The coated article of claim 43, wherein the first dielectric layer comprises titanium oxide.

47. The coated article of claim 43, wherein the coated article has a visible transmission of at least 74%.

48. The coated article of claim 43, wherein the coated article has a visible transmission of at least 77%.

49. The coated article of claim 43, wherein the coated article exhibits color characterized by a transmissive a* value from −4.0 to +2.0, and a glass side reflective a* value from −3.0 to +1.0.

50. The coated article of claim 43, wherein the first and second contact layers each comprise Ni and Cr.

51. The coated article of claim 43, wherein the IR reflecting layer comprising silver is from 30–200 Å thick.

52. The coated article of claim 1, wherein the IR reflecting layer comprises Ag and is from about 50–160 Å thick.

53. A coated article including a coating supported by a substrate, the coating comprising:
- a layer comprising Ag located between first and second metal oxide contact layers which contact the layer comprising Ag;
- a first dielectric layer having an index of refraction n<=3.0 provided between the substrate and the layer comprising Ag;
- a second dielectric layer having an index of refraction n=2.1–2.7 provided over the layer comprising Ag;
- a third dielectric layer comprising silicon oxynitride having an index of refraction n=1.6–1.9 provided over the layer comprising Ag,
- a fourth dielectric layer comprising silicon oxide having an index of refraction n=1.4–1.7 provided over the layer comprising Ag;
- wherein the third dielectric layer is provided between the second and fourth dielectric layers,
- wherein the coated article has a visible transmission of at least 70%, a sheet resistance (Rs)<=20 ohms/sq., and color characterized by a transmissive a* value from −4.0 to +2.0, a transmissive b* value from −5.0 to +4.0, a glass side reflective a* value from −5.0 to +3.0, and a glass side reflective b* value from −6.0 to +4.0; and
- wherein at least one of the first and second dielectric layers comprises titanium oxide.

54. The coated article of claim 53, wherein each of the first and second contact layers comprise an oxide of NiCr.

55. A coated article including a coating supported by a glass substrate, the coating comprising:
- an infrared (IR) reflecting layer comprising silver;
- a first dielectric layer provided between the IR reflecting layer and the glass substrate;
- a second dielectric layer comprising titanium oxide provided over the IR reflecting layer; and
- wherein the second dielectric layer comprising titanium oxide has a varying index of refraction so that an index of refraction n of the second dielectric layer comprising titanium oxide changes from a first value in a first portion of the second dielectric layer to a smaller second value in a second portion of the second dielectric layer, wherein the second portion of the second dielectric layer comprising titanium oxide with the smaller index of refraction n is further from the IR reflecting layer than is the first portion of the second dielectric layer.

* * * * *